US011021557B2

(12) United States Patent
Takahashi et al.

(10) Patent No.: US 11,021,557 B2
(45) Date of Patent: Jun. 1, 2021

(54) CARBOXYL-GROUP-CONTAINING COPOLYMER, AND METHOD FOR PRODUCING SAME

(71) Applicant: NIPPON SHOKUBAI CO., LTD., Osaka (JP)

(72) Inventors: Hikaru Takahashi, Osaka (JP); Ryosuke Takechi, Osaka (JP); Yasuhiro Ono, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 66 days.

(21) Appl. No.: 16/464,182

(22) PCT Filed: Nov. 22, 2017

(86) PCT No.: PCT/JP2017/042086
§ 371 (c)(1),
(2) Date: May 24, 2019

(87) PCT Pub. No.: WO2018/097206
PCT Pub. Date: May 31, 2018

(65) Prior Publication Data
US 2020/0291153 A1 Sep. 17, 2020

(30) Foreign Application Priority Data

Nov. 28, 2016 (JP) .............................. JP2016-230149
Feb. 15, 2017 (JP) .............................. JP2017-026054

(51) Int. Cl.
| C08F 222/06 | (2006.01) |
| C08F 226/00 | (2006.01) |
| C08F 226/02 | (2006.01) |
| C08F 220/06 | (2006.01) |
| C08F 220/04 | (2006.01) |
| C02F 5/10 | (2006.01) |
| C08F 220/58 | (2006.01) |
| C08F 220/56 | (2006.01) |
| C08F 222/02 | (2006.01) |

(52) U.S. Cl.
CPC .......... *C08F 220/06* (2013.01); *C08F 220/56* (2013.01); *C08F 220/585* (2020.02); *C08F 222/02* (2013.01); *C08F 222/06* (2013.01); *C02F 5/10* (2013.01); *C08F 220/04* (2013.01); *C08F 226/00* (2013.01); *C08F 226/02* (2013.01)

(58) Field of Classification Search
CPC .... C08F 222/06; C08F 226/02; C08F 220/06; C08F 220/56; C08F 222/02; C08F 222/04; C08F 226/00; C08F 226/04
See application file for complete search history.

(56) References Cited

U.S. PATENT DOCUMENTS

| 4,621,127 A | 11/1986 | Denzinger et al. |
| 5,627,249 A * | 5/1997 | Doki ..................... C08F 220/56 526/303.1 |
| 5,942,573 A | 8/1999 | Doki et al. |
| 8,076,434 B1 * | 12/2011 | Yoneda ................ C11D 3/3796 526/312 |
| 8,106,149 B2 * | 1/2012 | Yoneda ................ C11D 3/3773 528/332 |
| 8,816,031 B2 * | 8/2014 | Kimura .................... C08F 2/001 526/307.6 |
| 8,916,678 B2 * | 12/2014 | Yoneda ................. C08F 290/06 528/421 |
| 9,834,632 B2 * | 12/2017 | Yoneda .................. C11D 3/378 |
| 10,214,605 B2 * | 2/2019 | Sano ..................... C08F 220/06 |
| 2002/0156151 A1 * | 10/2002 | Culbertson ............ A61K 6/889 523/115 |
| 2008/0262192 A1 | 10/2008 | Yoneda |
| 2011/0183880 A1 * | 7/2011 | Yoneda ............. C08F 216/1458 510/299 |
| 2011/0245132 A1 | 10/2011 | Dupont et al. |
| 2011/0251115 A1 | 10/2011 | Dupont et al. |
| 2012/0157649 A1 * | 6/2012 | Yoneda ................ C08G 65/337 526/312 |
| 2014/0303337 A1 | 10/2014 | Backer et al. |
| 2015/0307642 A1 | 10/2015 | Yoneda et al. |
| 2016/0340831 A1 | 11/2016 | Sato et al. |
| 2018/0163346 A1 | 6/2018 | Sato et al. |

FOREIGN PATENT DOCUMENTS

| CN | 106120396 A * 11/2016 ......... C08F 2220/06 |
| JP | 61-73703 4/1986 |
| JP | 2000-212229 8/2000 |

(Continued)

OTHER PUBLICATIONS

International Preliminary Report on Patentability issued in International Application No. PCT/JP2017/042086, dated May 31, 2019, 9 pages.

*Primary Examiner* — Rip A Lee
(74) *Attorney, Agent, or Firm* — Hamre, Schumann, Mueller & Larson, P.C.

(57) ABSTRACT

The present invention provides a carboxyl group-containing copolymer having a better calcium ion trapping ability and a better carbon black dispersing ability than any conventional carboxyl group-containing copolymers. The present invention relates to a carboxyl group-containing copolymer including a structural unit (a) derived from an unsaturated monocarboxylic acid monomer (A), a structural unit (b) derived from an unsaturated dicarboxylic acid monomer (B), and a structural unit (c) derived from a cationic monomer (C).

17 Claims, No Drawings

(56) References Cited

FOREIGN PATENT DOCUMENTS

| | | | |
|---|---|---|---|
| JP | 2000-220092 | 8/2000 | |
| JP | 2004-124353 | 4/2004 | |
| JP | 2006-111710 | 4/2006 | |
| JP | 2008-523162 | 7/2008 | |
| JP | 2011-072851 | 4/2011 | |
| JP | 2011-116813 | 6/2011 | |
| JP | 2015-052194 | 3/2015 | |
| JP | 2015-522697 | 8/2015 | |
| JP | 2017-186720 | 10/2017 | |
| JP | 2017-186725 | 10/2017 | |
| WO | 2010/024448 | 3/2010 | |
| WO | WO-2014080628 A1 * | 5/2014 | ........... D21H 17/375 |
| WO | 2016/092965 | 6/2016 | |
| WO | 2014/080628 | 1/2017 | |

* cited by examiner

CARBOXYL-GROUP-CONTAINING COPOLYMER, AND METHOD FOR PRODUCING SAME

TECHNICAL FIELD

The present invention relates to carboxyl group-containing copolymers. Specifically, the present invention relates to a carboxyl group-containing copolymer useful in scale inhibitors, for example, and a method for producing the carboxyl group-containing copolymer.

BACKGROUND ART

Carboxyl group-containing polymers represented, for example, by sodium poly(meth)acrylate have been widely used for applications such as pigment dispersants (dispersants for inorganic particles), water treating agents (agents to prevent adhesion of scale components), and detergents. Polymers having better properties are demanded in the markets of these applications.

Regarding a method to meet such a demand, Patent Literature 1 discloses a water treating agent containing an amino group-containing copolymer that contains as essential constituents a structural unit (b) derived from a carboxyl group-containing monomer (B) and a structural unit (n) derived from at least one monomer (N) selected from amino group-containing monomers that contain an amino group substituted with one or more groups selected from C6-C20 aryl groups, C4-C20 alkyl groups, and C1-C8 hydroxyalkyl groups. Further, Patent Literatures 2 to 5 disclose copolymers of amino group-containing monomers and unsaturated carboxylic acid monomers.

CITATION LIST

Patent Literature

Patent Literature 1: JP 2011-72851 A
Patent Literature 2: JP 2008-523162 T
Patent Literature 3: JP 2015-522697 T
Patent Literature 4: WO 2010/024448
Patent Literature 5: JP 2011-116813 A

SUMMARY OF INVENTION

Technical Problem

Conventional carboxyl group-containing copolymers such as the above-described various carboxyl group-containing copolymers are insufficient in having both a calcium ion trapping ability and a carbon black dispersing ability. Polymers which exhibit both a better calcium ion trapping ability and a better carbon black dispersing ability are required. Many of conventional carboxyl group-containing copolymers used in pigment dispersants or water treating agents contain a hydrophilic monomer and a hydrophobic monomer in combination. To enhance the properties of the copolymers, new combinations of a hydrophilic monomer and a hydrophobic monomer need to be studied. However, some hydrophobic monomers are insufficiently reactive. Such hydrophobic monomers may lead to, when combined with hydrophilic monomers, copolymers with low flexibility of structural design. This leads to problems in studying the structures of various copolymers. One example of such a combination is a combination of a hydrophobic group-containing cationic monomer and an unsaturated dicarboxylic acid monomer. In copolymerization of these monomers, increasing the proportion of a structure derived from the hydrophobic monomer is difficult. Therefore, a method for enhancing the reactivity of the hydrophobic group-containing cationic monomer is required.

The present invention has been made in view of the state of the art and aims to provide a carboxyl group-containing copolymer having a better calcium ion trapping ability and a better carbon black dispersing ability than any conventional carboxyl group-containing copolymers, and a method for producing a carboxyl group-containing copolymer including copolymerizing an unsaturated dicarboxylic acid monomer and a hydrophobic group-containing cationic monomer, in which the hydrophobic group-containing cationic monomer can be reacted with a high reaction ratio.

Solution to Problem

The present inventors have conducted various studies on carboxyl group-containing copolymers and found that a carboxyl group-containing copolymer containing a structural unit derived from an unsaturated monocarboxylic acid monomer, a structural unit derived from an unsaturated dicarboxylic acid monomer, and a structural unit derived from a cationic monomer has an excellent calcium ion trapping ability and an excellent carbon black dispersing ability. The present inventors have further conducted various studies on methods for producing a carboxyl group-containing copolymer and found that when the pH in the reaction system is controlled at 0 to 6 during a certain time of time of the polymerization reaction of a monomer component containing an unsaturated dicarboxylic acid monomer and a hydrophobic group-containing cationic monomer, the hydrophobic group-containing cationic monomer can be reacted with a high reaction ratio. The present inventors successfully arrived at a solution to the above problems, and thus completed the present invention.

That is, the first aspect of the present invention relates to a carboxyl group-containing copolymer that contains a structural unit (a) derived from an unsaturated monocarboxylic acid monomer, a structural unit (b) derived from an unsaturated dicarboxylic acid monomer (B), and a structural unit (c) derived from a cationic monomer (C).

The second aspect of the present invention relates to a method for producing a carboxyl group-containing copolymer, the method including polymerizing a monomer component containing an unsaturated dicarboxylic acid monomer (B) and a hydrophobic group-containing cationic monomer (C1), the polymerization being conducted at a pH of 0 to 6 at least 30% of the time, which is taken as 100%, from the start of the polymerization reaction to the end of the last completed addition of the additions of a monomer component, a chain transfer agent, and a polymerization initiator.

The present invention is described in detail below. The matters referring to "the present invention" herein are common to the first aspect of the present invention and the second aspect of the present invention.

Any combination of two or more of the following preferred embodiments of the present invention is also a preferred embodiment of the present invention.

First Aspect of the Present Invention

The carboxyl group-containing copolymer according to the first aspect of the present invention (hereinafter, also referred to as copolymer according to the first aspect of the present invention) contains a structural unit (a) derived from an unsaturated monocarboxylic acid monomer (A), a structural unit (b) derived from an unsaturated dicarboxylic acid monomer (B), and a structural unit (c) derived from a cationic monomer (C). The unsaturated monocarboxylic acid monomer (A) is highly polymerizable, and thus can lead to a composition that contains a carboxyl group-containing copolymer with a small amount of residual monomers. The unsaturated monocarboxylic acid monomer (A) can also lead to a carboxyl group-containing copolymer having a sufficiently high weight average molecular weight.

The unsaturated dicarboxylic acid monomer (B) has a high density of carboxylic acid. Thus, the presence of the structural unit (b) allows the carboxyl group-containing copolymer of the present invention to have an excellent calcium ion trapping ability (hereinafter, also referred to as Ca trapping ability). A homopolymer of the unsaturated monocarboxylic acid monomer (A) has a low density of carboxylic acid, and thus has an insufficient Ca trapping ability. The unsaturated dicarboxylic acid monomer (B) has insufficient polymerization reactivity, and thus the unsaturated dicarboxylic acid monomer (B) alone has difficulty in providing a polymer having a sufficiently high weight average molecular weight. In contrast, the copolymer according to the first aspect of the present invention containing both the structural units (a) and (b) has a sufficiently high weight average molecular weight and an excellent Ca trapping ability.

The unsaturated monocarboxylic acid monomer (A) may be any monomer that contains one ethylenically unsaturated hydrocarbon group and one group capable of forming a carbanion. Examples of the monomer (A) include (meth)acrylic acid, crotonic acid, tiglic acid, 3-methylcrotonic acid, and 2-methyl-2-pentenoic acid; monovalent metal salts, divalent metal salts, ammonium salts, and organic amine salts of these acids; and half esters of any of the unsaturated dicarboxylic acid monomers (B) described below and a C1-C20 alcohol. The unsaturated monocarboxylic acid monomer (A) is preferably (meth)acrylic acid or a salt thereof. That is, in a preferred embodiment of the present invention, the unsaturated monocarboxylic acid monomer (A) includes at least one selected from the group consisting of (meth)acrylic acid and salts thereof in the carboxyl group-containing copolymer.

Non-limiting examples of the C1-C20 alcohol include aliphatic alcohols such as methanol, ethanol, propanol, butanol, pentanol, hexanol, and octanol and alicyclic alcohols such as cyclohexanol.

The unsaturated dicarboxylic acid monomer (B) may be any monomer that contains one ethylenically unsaturated hydrocarbon group and two groups capable of forming a carbanion in a molecule. Examples thereof include maleic acid, itaconic acid, mesaconic acid, citraconic acid, and fumaric acid; monovalent metal salts, divalent metal salts, ammonium salts, and organic amine salts of these acids; and anhydrides of these acids. The unsaturated dicarboxylic acid monomer (B) preferably includes at least one selected from the group consisting of maleic acid, salts thereof, and maleic anhydride. That is, in a preferred embodiment of the present invention, the unsaturated dicarboxylic acid monomer (B) includes at least one selected from the group consisting of maleic acid, salts of maleic acid, and maleic anhydride.

The cationic monomer (C) may be any monomer that contains at least one ethylenically unsaturated group and at least one cationic group. The cationic group herein is a group that contains or generates a cation. Examples of the cationic group include amino groups such as primary to tertiary amino groups, neutralized products obtained by neutralizing a primary, secondary, or tertiary amino group with an acid, and quaternary ammonium salt groups.

Specific examples of the cationic monomer (C) include (i) N,N-dialkylamino group-containing (meth)acrylates such as N,N-dimethylaminoethyl (meth)acrylate, N,N-diethylaminoethyl (meth)acrylate, N,N-dimethylaminopropyl (meth)acrylate, and N,N-diethylaminopropyl (meth)acrylate, monomers obtained by adding a quaternizing agent to any of these monomers, and neutralized products obtained by neutralizing any of these monomers with an acid such as hydrochloric acid or acetic acid; (ii) N,N-dialkylamino group-containing (meth)acrylamides such as N,N-dimethylaminoethyl (meth)acrylamide, N,N-diethylaminoethyl (meth)acrylamide, N,N-dimethylaminopropyl (meth)acrylamide, and N,N-diethylaminopropyl (meth)acrylamide, monomers obtained by adding a quaternizing agent to any of these monomers, and neutralized products obtained by neutralizing any of these monomers with an acid such as hydrochloric acid or acetic acid; (iii) monoalkylamino group-containing (meth)acrylates such as monomethylaminoethyl (meth)acrylate, monoethylaminoethyl (meth)acrylate, monomethylaminopropyl (meth)acrylate, monoethylaminopropyl (meth)acrylate, and 2-(tert-butylamino)ethyl (meth)acrylate and neutralized products obtained by neutralizing any of these (meth)acrylates with an acid such as hydrochloric acid or acetic acid; (iv) monoalkylamino group-containing (meth)acrylamides such as monomethylaminoethyl (meth)acrylamide, monoethylaminoethyl (meth)acrylamide, monomethylaminopropyl (meth)acrylamide, and monoethylaminopropyl (meth)acrylamide and neutralized products obtained by neutralizing any of these (meth)acrylamides with an acid such as hydrochloric acid or acetic acid; (v) esters of alkanolamines and (meth)acrylic acid, such as 2-aminoethyl (meth)acrylate and neutralized products obtained by neutralizing each ester with an acid such as hydrochloric acid or acetic acid, and N,N-diallyl methylamine, monomers obtained by adding a quaternizing agent to N,N-diallyl methylamine, and neutralized products obtained by neutralizing N,N-diallyl methylamine with an acid such as hydrochloric acid or acetic acid; (vi) allylamine and neutralized products obtained by neutralizing allylamine with an acid such as hydrochloric acid or acetic acid; and (vii) addition reaction products of an unsaturated monomer containing a C2-C8 cyclic ether-containing group and a C1-C20 amine compound, such as 1-allyloxy-3-dibutylamin-2-ol, monomers obtained by adding a quaternizing agent to any of these addition reaction products, and neutralized products obtained by neutralizing any of these addition reaction products with an acid such as hydrochloric acid or acetic acid.

Examples of the unsaturated monomer containing a C2-C8 cyclic ether-containing group include allyl glycidyl ether.

The C1-C20 amine compound may be any compound containing an amino group and reactive with a cyclic ether structure of an unsaturated monomer containing a C2-C8 cyclic ether-containing group. The number of carbon atoms of the C1-C20 amine compound is preferably 1 to 16, more preferably 2 to 10, still more preferably 3 to 8. Examples of the C1-C20 amine compound include neutralized products obtained by neutralizing a primary, secondary, or tertiary amine with an acid. These amine compounds may contain a functional group other than, and in addition to, an amino group.

Non-limiting examples of the functional group include a hydroxy group, a carboxyl group, a carbonyl group, an aldehyde group, an ester group, an ether group, a thiol group, a phosphate group, a phosphorous acid group, and a silane group.

Examples of the C1-C20 amine compound include C1-C20 (di)alkylamines; C1-C20 (di)alkanolamines; C2-C20 alkylalkanolamines; neutralized products obtained by neutralizing with an acid a tertiary amine such as a C3-C20 trialkylamine, a C3-C20 dialkylalkanolamine, or a C3-C20 alkyldialkanolamine; and C1-C20 (di)carboxylic acid amines.

Preferred examples of the C1-C20 (di)alkylamines include methylamine, ethylamine, propylamine, butylamine, dimethylamine, diethylamine, dipropylamine, dibutylamine, pentylamine, dipentylamine, hexylamine, dihexylamine, heptylamine, diheptylamine, octylamine, dioctylamine, dodecylamine, and didodecylamine.

Preferred examples of the C1-C20 (di)alkanolamines include methanolamine, ethanolamine, propanolamine, butanolamine, dimethanolamine, diethanolamine, dipropanolamine, dibutanolamine, and hexanolamine.

Preferred examples of the C2-C20 alkylalkanolamines include methylethanolamine.

Examples of the C3-C20 trialkylamine include trimethylamine, triethylamine, tripropylamine, tributylamine, tripentylamine, and trihexylamine. Preferred among these are C3-C9 trialkylamines such as trimethylamine and triethylamine, with trimethylamine being more preferred.

Examples of the C1-C20 (di)carboxylic acid amines include amino acids such as glycine, alanine, valine, leucine, isoleucine, phenylalanine, cysteine, glutamic acid, and aspartic acid and stereoisomers of these; N-alkylamino acetic acids such as N-methylamino acetic acid and N-ethylamino acetic acid; iminodicarboxylic acids such as iminodiacetic acid and iminodipropionic acid; and 2-aminoterephthalic acid. Preferred among these are C2-C8 iminodicarboxylic acids such as iminodiacetic acid and iminodipropionic acid, with iminodiacetic acid being more preferred.

The cationic group is preferably represented by any of the following formulas (1) to (3):

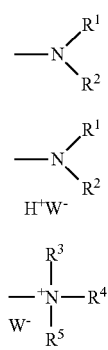

wherein in the formulas (1) and (2), $R^1$ and $R^2$ are the same as or different from each other and each represent a hydrogen atom or a C1-C20 hydrocarbon group optionally containing a functional group, at least one of $R^1$ or $R^2$ being a C1-C20 hydrocarbon group optionally containing a functional group; in the formula (3), $R^3$ to $R^5$ are the same as or different from each other and each represent a C1-C20 hydrocarbon group optionally containing a functional group; and $W^-$ is an anion. That is, the cationic monomer (C) preferably contains a group represented by any of the formulas (1) to (3).

Examples of the functional group optionally contained in the C1-C20 hydrocarbon group include the functional groups optionally contained in the above-described amine compounds.

The cationic monomer (C) preferably further contains a hydrophobic group. When the cationic monomer (C) contains a hydrophobic group, the carboxyl group-containing copolymer of the present invention can exhibit better effects of dispersing carbon black.

That is, in a preferred embodiment of the present invention, the carboxyl group-containing copolymer contains a structural unit (a) derived from an unsaturated monocarboxylic acid monomer (A), a structural unit (b) derived from an unsaturated dicarboxylic acid monomer (B), and a structural unit (c) derived from a cationic monomer (C), and the cationic monomer (C) contains a hydrophobic group.

The cationic group and the hydrophobic group may be separately present in the cationic monomer (C). Preferably, a hydrophobic group-containing cationic group is present in the monomer.

The groups represented by the formulas (1) to (3) in each of which at least one C1-C20 hydrocarbon group contains no functional group or contains a hydrophobic functional group are hydrophobic group-containing cationic groups.

The C1-C20 hydrocarbon group is preferably a group containing no functional group or containing a hydrophobic functional group.

Examples of the hydrophobic functional group include ester groups.

The C1-C20 hydrocarbon group preferably contains no functional group.

The hydrocarbon group may have a chain structure or a cyclic structure. A chain structure is preferred. The hydrocarbon group having a chain structure may be linear or branched.

The hydrocarbon group is preferably an alkyl, alkenyl, or aryl group, more preferably an alkyl or alkenyl group, still more preferably an alkyl group.

The number of carbon atoms of the hydrocarbon group is preferably 1 to 20, more preferably 2 to 18, particularly preferably 3 to 10, most preferably 3 to 8.

The alkyl group is preferably a C1-C20 alkyl group such as a methyl, ethyl, propyl, butyl, or pentyl group, more preferably a C2-C8 alkyl group, still more preferably a propyl or butyl group.

Non-limiting examples of $W^-$ in the formulas (2) and (3) include halide ions such as a chloride ion, a bromide ion, and an iodide ion; alkylsulfate ions such as a methyl sulfate ion; and organic acid ions such as an acetic acid ion.

In the formula (2), $W^-$ is preferably an organic acid ion.

In the formula (3), $W^-$ is preferably a halide ion or an alkylsulfate ion.

In the formulas (1) and (2), both $R^1$ and $R^2$ are preferably C1-C20 hydrocarbon groups.

The cationic group is any of secondary and tertiary amino groups, neutralized products obtained by neutralizing a secondary or tertiary amino group with an acid, and quaternary ammonium salt groups. Preferred among these are tertiary amino groups, neutralized products obtained by neutralizing a tertiary amino group with an acid, and quaternary ammonium salt groups.

When the cationic group is a tertiary amino group, a neutralized product obtained by neutralizing a tertiary amino group with an acid, or a quaternary ammonium salt group, the cationic monomer (C) contains two or more hydrophobic groups in a molecule. Such a copolymer can have enhanced hydrophobicity and a better carbon black dispersing ability.

Preferred tertiary amino groups and preferred neutralized products obtained by neutralizing a tertiary amino group with an acid include a dimethylamino group, a diethylamino group, a dipropylamino group, and a dibutylamino group, and neutralized products obtained by neutralizing any of these tertiary amino groups with an acid such as hydrochloric acid or acetic acid. More preferred are tertiary amino groups. When the cationic monomer has no electronic charge, it can have enhanced hydrophobicity and a better carbon black dispersing ability.

The cationic monomer (C) is preferably a compound represented by the following formula (4):

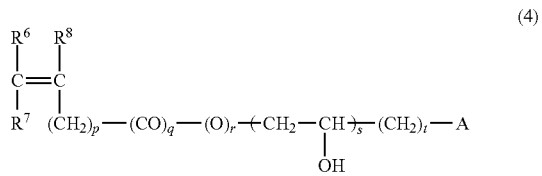

wherein $R^6$, $R^7$, and $R^8$ are the same as or different from each other and each represent a hydrogen atom or a methyl group; p and t are the same as or different from each other and each represent 0 to 5; q, r, and s are the same as or different from each other and each represent 0 or 1; and A is a cationic group.

In the formula (4), $R^6$ to $R^8$ are the same as or different from each other and each represent a hydrogen atom or a methyl group, at least one of $R^6$ or $R^7$ being preferably a hydrogen atom.

In the formula (4), p and t are the same as or different from each other and each represent 0 to 5; q, r, and s are the same as or different from each other and each represent 0 or 1; and the combination of p, q, r, s, and t, (i.e., (p, q, r, s, t)) is preferably (1, 0, 1, 0, 0), (2, 0, 1, 0, 0), (0, 1, 1, 0, 3), (0, 1, 1, 0, 2), or (1, 0, 1, 1, 1).

In the formula (4), A is a cationic group and is preferably a group represented by any of the formulas (1) to (3).

The cationic monomer (C) is more preferably an addition reaction product of an unsaturated monomer containing a C2-C8 cyclic ether-containing group with a C1-C20 (di) alkylamine, still more preferably an addition reaction product of an unsaturated monomer containing a C2-C8 cyclic ether-containing group with a C2-C18 dialkylamine, particularly preferably an addition reaction product of allyl glycidyl ether with a C3-C8 dialkylamine such as dibutylamine.

The carboxyl group-containing copolymer according to the first aspect of the present invention preferably further contains a structural unit (d) derived from a sulfonic acid group-containing monomer (D). That is, in a preferred embodiment of the present invention, the carboxyl group-containing copolymer contains a structural unit (a) derived from an unsaturated monocarboxylic acid monomer (A), the structural unit (b) derived from an unsaturated dicarboxylic acid monomer (B), the structural unit (c) derived from a cationic monomer (C), and the structural unit (d) derived from a sulfonic acid group-containing monomer (D). The presence of the structural unit (d) allows the copolymer according to the first aspect of the present invention to have a highly hydrophilic sulfonic acid group. Such a copolymer can be prevented from gelling or aggregating with calcium ions. The technical significance of having the structural unit (d) is more effectively exhibited particularly under hard water conditions.

The sulfonic acid group-containing monomer (D) may be any monomer containing a sulfonic acid (salt) group and an ethylenically unsaturated hydrocarbon group. Examples thereof include unsaturated sulfonic acids such as 3-(meth)allyloxy-2-hydroxypropanesulfonic acid, 2-(meth)allyloxyethylenesulfonic acid, 2-acrylamide-2-methylpropanesulfonic acid, p-styrenesulfonic acid, α-methyl-p-styrenesulfonic acid, vinyl sulfonic acid, vinyl sulfamic acid, (meth)allylsulfonic acid, isoprenesulfonic acid, 4-(allyloxy)benzenesulfonic acid, 1-methyl-2-propene-1-sulfonic acid, 1,1-dimethyl-2-propene-1-sulfonic acid, 3-butene-1-sulfonic acid, 1-butene-3-sulfonic acid, 2-acrylamide-1-methylpropanesulfonic acid, 2-acrylamide propanesulfonic acid, 2-acrylamide-n-butanesulfonic acid, 2-acrylamide-2-phenylpropanesulfonic acid, and 2-((meth)acryloyloxy)ethanesulfonic acid and salts thereof. The sulfonic acid group-containing monomer (D) is preferably a monomer represented by the following formula (5):

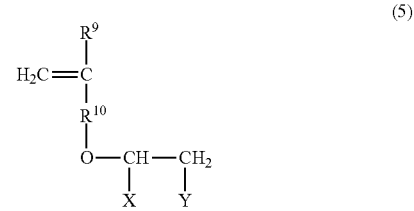

wherein $R^9$ is a hydrogen atom or a methyl group; $R^{10}$ is a $CH_2$ group, a $CH_2CH_2$ group, or a direct bond; X and Y each represent a hydroxy group or $—SO_3Z$, Z being a hydrogen atom, a metal atom, an ammonium group, or an organic amine group, at least one of X or Y being $—SO_3Z$. That is, the carboxyl group-containing copolymer preferably contains a structural unit derived from a monomer represented by the formula (5).

$R^9$ is preferably a hydrogen atom.

$R^{10}$ is preferably a $CH_2$ group. When $R^{10}$ is a $CH_2$ group, the effects of the present invention can be more effectively achieved.

Preferably, one of X and Y is a hydroxy group, and the other is a sulfonic acid (salt) group. More preferably, X is a hydroxy group, and Y is a sulfonic acid (salt) group.

The sulfonic acid (salt) group-containing monomer is preferably 3-(meth)allyloxy-2-hydroxy-1-propanesulfonic acid or a salt thereof.

The copolymer according to the first aspect of the present invention may optionally contain a structural unit (e) derived from a monomer (E) other than the unsaturated monocarboxylic acid monomer (A), the unsaturated dicarboxylic acid monomer (B), the cationic monomer (C), and the sulfonic acid group-containing monomer (D).

Non-limiting examples of the monomer (E) include polyalkylene glycol chain-containing monomers such as monomers prepared by adding an alkylene oxide to an unsaturated alcohol (e.g., (meth)allyl alcohol or isoprenol) and (meth)acrylic acid esters of alkoxy alkylene glycols; vinyl aromatic monomers containing a heterocyclic aromatic hydrocarbon group, such as vinyl pyridine and vinyl imidazole; N-vinyl monomers such as N-vinylpyrrolidone, N-vinylformamide, N-vinylacetamide, N-vinyl-N-methylformamide, N-vinyl-N-methylacetamide, and N-vinyloxazolidone; amide monomers such as (meth)acrylamide, N,N-dimethylacrylamide, and N-isopropylacrylamide; hydroxy group-containing monomers such as (meth)allyl alcohol and isoprenol; alkyl (meth)acrylate monomers such as butyl (meth)acrylate, 2-ethylhexyl (meth)acrylate, and dodecyl (meth)acrylate; hydroxyalkyl(meth)acrylate monomers such as 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth)acrylate; vinyl aryl monomers such as styrene, indene, and vinylaniline; isobutylene; and vinyl acetate.

The proportion of the structural unit (a) in 100 mol % of all structural units of the copolymer according to the first aspect of the present invention is preferably, but not limited to, 10 to 70 mol %. The copolymer containing the preferred proportion of the structural unit (a) can have a weight average molecular weight within a preferred range. The proportion of the structural unit (a) is more preferably 15 to 60 mol %, still more preferably 20 to 50 mol %, particularly preferably 25 to 45 mol %.

The proportion of the structural unit (b) in 100 mol % of all structural units of the copolymer according to the first aspect of the present invention is preferably, but not limited to, 10 to 70 mol %. The copolymer containing the preferred proportion of the structural unit (b) has a better Ca trapping ability. The proportion of the structural unit (b) is more preferably 15 to 60 mol %, still more preferably 20 to 50 mol %, particularly preferably 25 to 45 mol %.

The proportion of the structural unit (c) in 100 mol % of all structural units of the copolymer according to the first aspect of the present invention is preferably, but is not limited to, 1 to 20 mol %, more preferably 2 to 18 mol %, still more preferably 3 to 15 mol %, particularly preferably 4 to 10 mol %.

The proportion of the structural unit (d) in 100 mol % of all structural units of the copolymer according to the first aspect of the present invention is preferably, but not limited to, 1 to 20 mol %. The copolymer containing the preferred proportion of the structural unit (d) can be prevented from gelling or aggregating with calcium ions. The proportion of the structural unit (d) is more preferably 2 to 18 mol %, still more preferably 3 to 15 mol %, particularly preferably 4 to 10 mol %.

The proportion of the structural unit (e) in 100 mol % of all structural units of the copolymer according to the first aspect of the present invention is preferably, but is not limited to, 0 to 20 mol %, more preferably 0 to 15 mol %, still more preferably 0 to 10 mol %, particularly preferably 0 to 5 mol %, most preferably 0 mol %.

The carboxyl group-containing copolymer according to the first aspect of the present invention preferably has a weight average molecular weight of 2000 to 500000, more preferably 3000 to 100000, still more preferably 4000 to 50000, particularly preferably 5000 to 20000. The copolymer having a weight average molecular weight within the above preferred range can have a better calcium ion trapping ability.

The weight average molecular weight of the copolymer may be measured by the method described in the Examples.

In the carboxyl group-containing copolymer according to the first aspect of the present invention, the proportion of carboxyl groups in salt form in 100 mol % of all carboxyl groups of the carboxyl group-containing copolymer is preferably 20 to 95 mol % (the degree of neutralization is 20 to 95 mol %). The proportion is more preferably 30 to 90 mol %, still more preferably 40 to 80 mol %.

Examples of the salt include metal salts, ammonium salts, and organic amine salts. The metal salts are preferably salts of an alkali metal such as sodium or potassium, more preferably sodium salts.

<Method for Producing Carboxyl Group-Containing Copolymer According to the First Aspect of the Present Invention>

The carboxyl group-containing copolymer according to the first aspect of the present invention may be produced by any method. It can be produced by polymerizing the monomer component. Specific examples and preferred examples of the monomer component are as described above. The proportions of the monomers (A), (B), (C), (D), and (E) in the monomer component are preferably the same as the preferred proportions of the structural units (a), (b), (c), (d), and (e) in the copolymer.

The carboxyl group-containing copolymer according to the first aspect of the present invention may be produced by any polymerization method. The below-described production method according to the second aspect of the present invention is preferred.

Second Aspect of the Present Invention

The method for producing a carboxyl group-containing copolymer according to the second aspect of the present invention includes polymerizing a monomer component containing an unsaturated dicarboxylic acid monomer (B) and a hydrophobic group-containing cationic monomer (C1), the polymerization being conducted at a pH of 0 to 6 at least 30% of the time, which is taken as 100%, from the start of the polymerization reaction to the end of the last completed addition of the additions of a monomer component, a chain transfer agent, and a polymerization initiator.

In the present invention, the polymerization refers to a step from the start of the polymerization reaction to the end of the last completed addition of the additions of a monomer component, a chain transfer agent, and a polymerization initiator.

The polymerization is conducted at a pH of 0 to 6 at least 30% of the time, which is taken as 100%, from the start of the polymerization reaction to the end of the last completed addition of the additions of a monomer component, a chain transfer agent, and a polymerization initiator. Thereby, the water solubility of the hydrophobic group-containing cationic monomer (C1) is enhanced, leading to an increase in the reaction efficiency. Among hydrophobic group-containing monomers, one containing no cationic group is less soluble in water of any pH. Thus, compared to the case of using a hydrophobic group-containing monomer that contains no cationic group, the present invention in which the polymerization is conducted using a hydrophobic group-containing cationic monomer at a pH of 6 or less enables introduction of a greater number of hydrophobic groups into the copolymer. Thereby, the carbon black dispersing ability of the carboxyl group-containing copolymer is enhanced.

The polymerization is conducted at a pH of 0 to 6 at least 30% of the time, which is taken as 100%, from the start of the polymerization reaction to the end of the last completed addition of the additions of a monomer component, a chain transfer agent, and a polymerization initiator. The 30% of the time may be a continuous time or may be the sum of discontinuous times. The proportion of the time of the polymerization conducted at a pH of 0 to 6 is preferably at least 40%, more preferably 50%, still more preferably 60%, further preferably 70%, further more preferably 80%, particularly preferably 90%, most preferably 100%.

The pH is more preferably 0.05 to 5.9, still more preferably 0.1 to 5.8, particularly preferably 0.2 to 5.7, most preferably 0.3 to 5.6.

In the production method according to the second aspect of the present invention, polymerization is preferably conducted at a pH of 0 to 6 at least 30% from the start of the polymerization reaction of the time, which is taken as 100%, from the start of the polymerization reaction to the end of the last completed addition of the additions of a monomer component, a chain transfer agent, and a polymerization initiator. More preferably, polymerization is conducted at a pH of 0 to 6 at least 40%, still more preferably at least 50%, further preferably at least 60%, further more preferably at least 70%, particularly preferably at least 90%, most preferably 100% from the start of the polymerization reaction.

The pH may be measured by the method described in the Examples.

The pH may be controlled by any method and may be controlled using a commonly used acid or base. For example, the pH may be controlled using a base when a monomer such as an acidic unsaturated dicarboxylic acid monomer (B) is used in the monomer component and may be controlled using an acid when a monomer such as a neutralized unsaturated dicarboxylic acid monomer (B) is used.

Non-limiting examples of the base include alkali metal hydroxides such as sodium hydroxide.

The polymerization may be conducted under any conditions as long as the polymerization is conducted at a pH of 0 to 6 at least 30% of the time, which is taken as 100%, from the start of the polymerization reaction to the end of the last completed addition of the additions of a monomer component, a chain transfer agent, and a polymerization initiator. The rest of the time, that is, less than 70% of the time of the polymerization may be conducted at a pH greater than 6.

Even when the pH is greater than 6, the pH is preferably 8 or less. Such a pH can sufficiently prevent the reduction in the reaction ratio of the hydrophobic group-containing cationic monomer (C1). The pH is more preferably 7.5 or less, still more preferably 7 or less, particularly preferably 6.5 or less.

In the polymerization, the reaction ratio of the hydrophobic group-containing cationic monomer (C1) is preferably 15% or more at the end of the last completed addition among additions of a monomer component, a chain transfer agent, and a polymerization initiator.

The reaction ratio is more preferably 35% or higher, still more preferably 55% or higher, further preferably 70% or higher, particularly preferably 80% or higher, most preferably 90% or higher. The reaction ratio in the present invention is also referred to as a conversion ratio.

The reaction ratio can be calculated by determining the amount of unreacted monomers under the below-described HPLC measurement conditions.

In the production method according to the second aspect of the present invention, the polymerization may be conducted by any method that can be conducted at a pH of 0 to 6, such as radical polymerization. Specifically, solution polymerization such as aqueous solution polymerization, emulsion polymerization, suspension polymerization, or dispersion polymerization may be used. Preferred among the examples of these polymerization methods is solution polymerization because it is highly safe and can reduce the production cost (the cost of the polymerization).

The reaction of the radical polymerization can be conducted in any way such as a usual way. For example, the reaction may be conducted by adding dropwise the monomers and a polymerization initiator (hereinafter, also referred to as "initiator") to a solvent previously introduced in the reaction system. In such a reaction, each solution to be added dropwise may have any appropriate concentration.

When the reaction is conducted by adding dropwise the monomers and an initiator to a solvent previously introduced in the reaction system, the monomer component, the initiator component, and other optional additives may be dissolved in different solvents and appropriately added (dropwise) to the reaction system during polymerization or may be appropriately added (dropwise) as they are to the reaction system during polymerization without being dissolved in solvents, to carry out the polymerization. In the reaction, part or the whole of the monomer component to be used may be previously introduced (initially added) to the reaction system before the start of polymerization. Preferably, portions of the unsaturated dicarboxylic acid monomer (B), the hydrophobic group-containing cationic monomer (C1), and optionally the below-described sulfonic acid group-containing monomer (D) may be initially added.

The solution polymerization includes polymerization of the monomer component in a solvent.

The solvent preferably contains water. The amount of water is preferably 50 mass % or more based on 100 mass % of the whole solvent. The solvent may be an organic solvent as long as the polymerization can be conducted at a pH of 0 to 6. Suitable examples the organic solvent include aqueous organic solvents such as lower alcohols (e.g., ethanol and isopropanol); amides (e.g., N,N-dimethylformamide); ethers (e.g., diethyl ether and dioxane); glycol, glycerol, and polyethylene glycols.

Each of the solvents may be used alone, or two or more of these may be used in combination.

The amount of the solvent is preferably 40 to 300 parts by mass relative to 100 parts by mass of all monomers.

When the initial addition is performed in the radical polymerization, the pH in the reaction system before polymerization is preferably 0 to 6, more preferably 0.05 to 5.9, still more preferably 0.1 to 5.8, particularly preferably 0.2 to 5.7, most preferably 0.3 to 5.6. When the pH of the reaction system before polymerization is 6 or less, the hydrophobic group-containing cationic monomer (C1) can have enhanced water solubility and can be more efficiently polymerized. Thus, the proportion of the structural unit (c1) in the resulting carboxyl group-containing copolymer can be more increased.

The pH is controlled by the same method as that for controlling the pH in the reaction system before polymerization.

In a preferred embodiment of the present invention, in the method for producing a carboxyl group-containing copolymer of the present invention, the pH in the reaction system before polymerization is 0 to 6, and the pH in the reaction system is 0 to 6 at least 30% of the time, which is taken as 100%, from the start of the polymerization reaction to the end of the last completed addition of the additions of a monomer component, a chain transfer agent, and a polymerization initiator.

In the production method, the polymerization temperature is appropriately selected depending on factors such as the polymerization method, the solvent, and the polymerization initiator to be used. It is preferably 70° C. to 120° C. That is, the polymerization in the production method of the present invention is conducted at preferably 70° C. to 120° C., more preferably 75° C. to 110° C., still more preferably 80° C. to 105° C., particularly preferably 85 to 100° C. At a polymerization temperature of 70° C. or higher, the solubility of the monomer component is more enhanced, leading to an enhancement of the reactivity.

The polymerization temperature during the polymerization reaction needs not to be kept constant. The temperature may be changed (increased or decreased) with time during the polymerization reaction in accordance with the method of dropwise addition of the monomer component or the initiator. The polymerization temperature refers to the temperature of the reaction solution in the polymerization reaction.

In the production method, the polymerization time is preferably, but not limited to, 30 to 420 minutes. The term "polymerization time" in the present invention refers to a time during which the monomers are added, that is, a time from the start to the end of addition of the monomers, unless otherwise noted.

The method for producing a carboxyl group-containing copolymer according to the second aspect of the present invention may optionally contain a different step other than, and in addition to, the polymerization. Examples of the different step include aging and neutralization.

The production method preferably includes aging after the completion of additions of the monomer component, the chain transfer agent, and the polymerization initiator to increase the percentage of the polymerization of the monomers. The aging time is preferably 1 to 120 minutes.

When the production method includes aging, it is preferably conducted at a pH of 0 to 6, more preferably at a pH of 0.05 to 5.9, still more preferably at a pH of 0.1 to 5.8, particularly preferably at a pH of 0.5 to 5.7, most preferably at a pH of 1 to 5.6.

When aging is conducted at a pH of 0 to 6, at least part of the aging is conducted at a pH of 0 to 6, and preferably 50% to 70%, more preferably 70% to 90%, most preferably 100% of the aging time, which is taken as 100%, is conducted at a pH of 0 to 6.

When the production method includes aging, the aging time is usually, but is not limited to, 1 to 240 minutes, preferably 1 to 180 minutes, more preferably 1 to 120 minutes.

The production method preferably includes aging conducted at a pH of 0 to 6 at least 30 minutes, more preferably 60 minutes after the completion of the additions of the monomer component, the chain transfer agent, and the polymerization initiator.

In the production method, neutralization may be conducted after the polymerization reaction or the aging.

The neutralization preferably uses an alkali component.

The alkali component may be commonly used one, and is preferably an alkali metal hydroxide, more preferably sodium hydroxide.

The amount of the alkali component used in the neutralization may be set such that the proportion of carboxyl groups in salt form in 100 mol % of all carboxyl groups of the resulting carboxyl group-containing copolymer is 20 to 95 mol % (the degree of neutralization: 20 to 95 mol %).

The production method according to the second aspect of the present invention includes polymerizing a monomer component containing the unsaturated dicarboxylic acid monomer (B). The unsaturated dicarboxylic acid monomer (B) has a high density of carboxylic acid. Thus, the presence of the unsaturated dicarboxylic acid monomer (B) in the monomer component allows the carboxyl group-containing copolymer to exhibit excellent effects of a calcium ion trapping ability.

The unsaturated dicarboxylic acid monomer (B) is the same as the unsaturated dicarboxylic acid monomer (B) in the first aspect of the present invention. The unsaturated dicarboxylic acid monomer (B) is preferably selected from the group consisting of maleic acid, salts of maleic acid, and maleic anhydride. When maleic anhydride is used as the unsaturated dicarboxylic acid monomer (B) in the production method according to the second aspect of the present invention, a neutralized maleic anhydride is preferred because it is highly soluble. Particularly in this case, the technical significance of controlling the pH to 0 to 6 in the polymerization reaction is more effectively exhibited.

The production method according to the second aspect of the present invention includes polymerizing a monomer component containing a hydrophobic group-containing cationic monomer (C1). Thus, the presence of the hydrophobic group-containing cationic monomer (C1) allows the carboxyl group-containing copolymer to exhibit excellent effects of carbon black dispersing ability.

The hydrophobic group-containing cationic monomer (C1) may be any cationic monomer that contains an ethylenically unsaturated group and a hydrophobic group. The cationic group and the hydrophobic group may be separately present in the monomer, or a hydrophobic group-containing cationic group may be present in the monomer.

Specific examples of the hydrophobic group-containing cationic monomer (C1) include the same as the specific examples of the cationic monomer (C) described for the first aspect of the present invention.

One specific example of the cationic monomer (C1) is an addition reaction product of an unsaturated monomer containing a C2-C8 cyclic ether-containing group with a C1-C20 amine compound. The C1-C20 amine compound is preferably a hydrophobic group-containing amine compound among the C1-C20 amine compounds described for the first aspect of the present invention.

Examples of the C1-C20 amine compound containing a hydrophobic group include the above-described C1-C20 (di)alkylamines; C1-C20 (di)alkanolamines; C2-C20 alkylalkanolamines; neutralized products obtained by neutralizing with an acid a tertiary amine such as a C3-C20 trialkylamine, a C3-C20 dialkylalkanolamine, or a C3-C20 alkyldialkanolamine; and C1-C20 carboxylic acid amines containing a hydrophobic group.

Examples of the C1-C20 carboxylic acid amines containing a hydrophobic group include hydrophobic group-containing amino acids such as alanine, valine, leucine, isoleucine, and phenylalanine and stereoisomers of these; and N-alkylamino acetic acids such as N-methylamino acetic acid and N-ethylamino acetic acid.

The hydrophobic group-containing cationic monomer (C1) preferably contains a hydrophobic group-containing cationic group.

The hydrophobic group-containing cationic group is preferably represented by any of the following formulas (6) to (8):

(6)

(7)

-continued

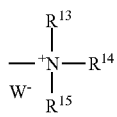
(8)

wherein in the formulas (6) and (7), $R^{11}$ and $R^{12}$ are the same as or different from each other and each represent a hydrogen atom or a C1-C20 hydrocarbon group optionally containing a functional group, at least one of $R^{11}$ or $R^{12}$ being a C1-C20 hydrocarbon group containing no functional group or containing a hydrophobic functional group; in the formula (8), $R^{13}$ to $R^{15}$ are the same as or different from each other and each represent a C1-C20 hydrocarbon group optionally containing a functional group, at least one of $R^{13}$ to $R^{15}$ being a C1-C20 hydrocarbon group containing no functional group or containing a hydrophobic functional group; and in the formulas (7) and (8), $W^-$ is an anion. That is, the cationic monomer (C1) preferably contains a group represented by any of the formulas (6) to (8).

The groups represented by the formulas (6) to (8) are hydrophobic group-containing cationic groups when having at least one C1-C20 hydrocarbon group containing no functional group or at least one C1-C20 hydrocarbon group containing a hydrophobic functional group.

The C1-C20 hydrocarbon group preferably contains no functional group.

The hydrocarbon group may have a chain structure or a cyclic structure. A chain structure is preferred. The hydrocarbon group having a chain structure may be linear or branched.

Specific examples of the hydrocarbon group, the preferred range of the number of carbon atoms, and specific examples of the functional group which is optionally contained in the hydrocarbon group are as described for the groups represented by the formulas (1) to (3) in the first aspect of the present invention.

$W^-$ in the formulas (6) and (8) is the same as $W^-$ in the formulas (1) and (2).

In the formula (7), $W^-$ is preferably an organic acid ion.

In the formula (8), $W^-$ is preferably a halide ion or an alkylsulfate ion.

In the formulas (6) and (7), both $R^{11}$ and $R^{12}$ are preferably C1-C20 hydrocarbon groups.

The cationic group is any of secondary and tertiary amino groups, neutralized products obtained by neutralizing a secondary or tertiary amino group with an acid, and quaternary ammonium salt groups. Preferred among these are tertiary amino groups, neutralized products obtained by neutralizing a tertiary amino group with an acid, and quaternary ammonium salt groups.

When the cationic group of the hydrophobic group-containing cationic monomer (C1) is a tertiary amino group, the monomer (C1) contains two hydrophobic groups. Thus, the monomer (C1) has lower water solubility at a pH of greater than 6. Particularly in this case, the technical significance of the present invention is effectively exhibited.

When the cationic group is a tertiary amino group, a neutralized product obtained by neutralizing a tertiary amino group with an acid, or a quaternary ammonium salt group, the cationic monomer (C1) contains two or more hydrophobic groups in a molecule. The copolymer has enhanced hydrophobicity and a better carbon black dispersing ability.

That is, polymerization at a pH of 6 or less using a monomer that contains a tertiary amino group, a neutralized product obtained by neutralizing a tertiary amino group with an acid, or a quaternary ammonium salt group as the cationic monomer (C1) allows greater number of hydrophobic groups to be introduced into the copolymer than polymerization using a monomer that contains one hydrophobic group and no cationic group. Thus, the copolymer has a better carbon black dispersing ability.

Preferred tertiary amino groups and preferred neutralized products obtained by neutralizing a tertiary amino group with an acid include a dimethylamino group, a diethylamino group, a dipropylamino group, and a dibutylamino group, and neutralized products obtained by neutralizing any of these tertiary amino groups with an acid such as hydrochloric acid or acetic acid. More preferred are tertiary amino groups. When the cationic monomer has no electronic charge, it can have enhanced hydrophobicity and a better carbon black dispersing ability.

The hydrophobic group-containing cationic monomer (C1) is preferably a compound represented by the following formula (9):

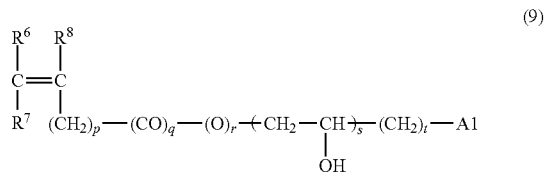
(9)

wherein $R^6$, $R^7$, and $R^8$ are the same as or different from each other and each represent a hydrogen atom or a methyl group; p and t are the same as or different from each other and each represent 0 to 5; q, r, and s are the same as or different from each other and each represent 0 or 1; and A1 is a cationic group.

The preferred structures of $R^6$ to $R^8$ and the preferred combinations of p, q, r, s, and t in the formula (9) are the same as those for the formula (4).

In the formula (9), A1 is a cationic group and is preferably a group represented by any of the formulas (6) to (8).

The hydrophobic group-containing cationic monomer (C1) is more preferably an addition reaction product of an unsaturated monomer containing a C2-C8 cyclic ether-containing group with a C1-C20 (di)alkylamine, still more preferably an addition reaction product of an unsaturated monomer containing a C2-C8 cyclic ether-containing group with a C2-C18 dialkylamine, particularly preferably an addition reaction product of allyl glycidyl ether with a C3-C8 dialkylamine such as dibutylamine.

In the production method of the present invention, the monomer component preferably contains the unsaturated monocarboxylic acid monomer (A). The unsaturated monocarboxylic acid monomer (A) is highly polymerizable, and thus can lead to a composition that contains a carboxyl group-containing copolymer with a small amount of residual monomers. The unsaturated monocarboxylic acid monomer (A) can also lead to a carboxyl group-containing copolymer having a sufficiently high weight average molecular weight.

The unsaturated monocarboxylic acid monomer (A) is the same as the unsaturated monocarboxylic acid monomer (A) in the first aspect of the present invention. The unsaturated monocarboxylic acid monomer (A) preferably includes at least one selected from the group consisting of (meth)acrylic acid and salts thereof. That is, in one preferred embodiment of the second aspect of the present invention, the production method includes polymerizing a monomer component containing at least one selected from the group consisting of (meth)acrylic acid and salts thereof as the unsaturated monocarboxylic acid monomer (A).

In the production method of the present invention, the monomer component preferably contains the sulfonic acid group-containing monomer (D). The copolymer obtained by polymerizing the monomer component containing the sulfonic acid group-containing monomer (D) contains the structural unit (d) derived from the sulfonic acid group-containing monomer (D). Such a copolymer has a highly hydrophilic sulfonic acid group, and thus can be prevented from gelling or aggregating with calcium ions. The technical significance of having the structural unit (d) is effectively exhibited particularly under hard water conditions.

The sulfonic acid group-containing monomer (D) is the same as the sulfonic acid group-containing monomer (D) in the first aspect of the present invention.

In the production method of the present invention, the monomer component may optionally contain the monomer (E) other than the unsaturated dicarboxylic acid monomer (B), the hydrophobic group-containing cationic monomer (C1), the unsaturated monocarboxylic acid monomer (A), and the sulfonic acid group-containing monomer (D).

The monomer (E) is the same as the monomer (E) in the first aspect of the present invention.

In the production method of the present invention, the proportion of the unsaturated dicarboxylic acid monomer (B) in 100 mol % of all monomers of the monomer component is preferably, but not limited to, 10 to 70 mol %. The copolymer containing the preferred proportion of the unsaturated dicarboxylic acid monomer (B) can have an excellent Ca trapping ability. The proportion of the unsaturated dicarboxylic acid monomer (B) is more preferably 15 to 60 mol %, still more preferably 20 to 50 mol %, particularly preferably 25 to 45 mol %.

The proportion of the hydrophobic group-containing cationic monomer (C1) in 100 mol % of all monomers of the monomer component is preferably, but is not limited to, 1 to 20 mol %, more preferably 2 to 18 mol %, still more preferably 3 to 15 mol %, particularly preferably 4 to 10 mol %.

The proportion of the unsaturated monocarboxylic acid monomer (A) in 100 mol % of all monomers of the monomer component is preferably, but not limited to, 10 to 70 mol %. The copolymer containing the preferred proportion of the unsaturated monocarboxylic acid monomer (A) can have a weight average molecular weight within a more preferred range. The proportion of the unsaturated monocarboxylic acid monomer (A) is more preferably 15 to 60 mol %, still more preferably 20 to 50 mol %, particularly preferably 25 to 45 mol %.

The proportion of the sulfonic acid group-containing monomer (D) in 100 mol % of all monomers of the monomer component is preferably, but not limited to, 1 to 20 mol %. The copolymer containing the preferred proportion of the sulfonic acid group-containing monomer (D) can be sufficiently prevented from gelling or aggregating with calcium ions. The proportion of the sulfonic acid group-containing monomer (D) is more preferably 2 to 18 mol %, still more preferably 3 to 15 mol %, particularly preferably 4 to 10 mol %.

The proportion of the monomer (E) in 100 mol % of all monomers of the monomer component is preferably, but is not limited to, 0 to 20 mol %, more preferably 0 to 15 mol %, still more preferably 0 to 10 mol %, particularly preferably 0 to 5 mol %, most preferably 0 mol %.

The amount of the residual unreacted monomers (amount of residual monomers) is preferably 0.01 to 50000 ppm at the completion of the polymerization reaction (or after neutralization, when the neutralization is conducted after the polymerization reaction) based on the total mass of the polymerization reaction liquid.

In the production method of the present invention, the reaction ratio of the hydrophobic group-containing cationic monomer (C1) is preferably 15% or more, more preferably 20% or more, still more preferably 30% or more, further preferably 50% or more, particularly preferably 70% or more.

<Polymerization Initiator>

The polymerization initiator used in the production method may be a commonly used one. Specific suitable examples of the polymerization initiator include hydrogen peroxide; persulfates such as sodium persulfate and ammonium persulfate; azo compounds such as 2,2'-azobis(2-amidinopropane)hydrochloride, 4,4'-azobis-4-cyanovaleric acid, and azobisisobutyronitrile; and organic peroxides such as benzoyl peroxide, lauroyl peroxide, peracetic acid, and di-t-butyl peroxide. Preferred among these polymerization initiators are hydrogen peroxide, persulfates, and 2,2'-azobis(2-amidinopropane)hydrochloride, and more preferred are persulfates and 2,2'-azobis(2-amidinopropane)hydrochloride. Each of these initiators may be used alone, or two or more of these may be used in combination.

The total amount of the polymerization initiator(s) may be any amount that can initiate the copolymerization of the monomers. The total amount is preferably 15 g or less, more preferably 1 to 12 g relative to 1 mol total of the monomer component.

The polymerization initiator may be added by any method. The amount of the polymerization initiator substantially continuously added dropwise is preferably 50 mass % or more, particularly preferably 80 mass % or more of the whole amount (required amount) of the polymerization initiator to be used. Most preferably, the entire amount of the polymerization initiator is added dropwise. The polymerization initiator is preferably continuously added dropwise as described above. The rate of the dropwise addition can be appropriately selected.

The time to add dropwise the polymerization initiator is not limited. When a relatively rapidly decomposable initiator such as a persulfate (e.g., ammonium persulfate, potassium persulfate, sodium persulfate) is used under conditions such as the above-described pH and the below-described polymerization temperature during polymerization, the initiator is preferably added dropwise at least until the end of the dropwise addition of the monomers. More preferably, the dropwise addition of the initiator is terminated within 30 minutes after the end of the dropwise addition of the monomers. Particularly preferably, the dropwise addition of the initiator is terminated within 5 to 20 minutes after the end of the dropwise addition of the monomers. This can significantly reduce the amount of the residual monomers in the copolymer. Even if the dropwise addition of the initiator is completed before the completion of the dropwise addition of the monomers, the polymerization is not adversely affected. The timing of completing the dropwise addition of the initiator may be set depending on the amount of the residual monomers in the copolymer to be obtained.

The above-describes the preferred range of only the timing of completing the dropwise addition of the relatively rapidly decomposable initiator. The starting time of the dropwise addition is not limited and may be appropriately set. For example, dropwise addition of the initiator may be stated before the start of the dropwise addition of the monomers in some cases. When two or more initiators are used in combination, dropwise addition of one of the initiators may be stated first, and after a certain time or after the completion of the dropwise addition, the other or another one of the initiators may be added dropwise. In each case, the starting time of the dropwise addition may be appropriately set depending on the decomposition rate of the initiator and the reactivity of the monomers.

<Chain Transfer Agent>

The production method preferably uses a chain transfer agent as a molecular weight modifier for polymers. Examples of the chain transfer agent include pyrosulfurous acid (salts), dithionous acid (salts), sulfurous acid (salt), hydrogen sulfites, compounds that can generate a hydrogen sulfite, thiol chain transfer agents such as mercaptoethanol, thioglycolic acid, and 3-mercaptopropionic acid; halides such as carbon tetrachloride, methylene chloride, and bromoform; secondary alcohols such as isopropanol and glycerol; and lower oxides and salts thereof such as phosphorous acid, hypophosphorous acid, and salts thereof (e.g., sodium hypophosphite, potassium hypophosphite). Preferred are hydrogen sulfites and compounds that can generate a hydrogen sulfite. The salts are suitably salts of metal atoms, ammonium, or organic amines.

The amount of the chain transfer agent may be any amount that allows good polymerization of the monomer component. The amount is preferably 1 to 20 g relative to 1 mol total of the monomer component.

<Decomposition Catalyst, Reducing Compound>

In the method for producing a carboxyl group-containing copolymer of the present invention, a decomposition catalyst for polymerization initiators or a reducing compound (also referred to as a reaction accelerator) may be used (may be added to the polymerization system) in addition to the polymerization initiator.

Examples of compounds serving as the decomposition catalyst for polymerization initiators or the reducing compound include heavy metal ions (and heavy metal salts). That is, in the method for producing a carboxyl group-containing copolymer of the present invention, a heavy metal ion (or a heavy metal salt) may be used (may be added to the polymerization system) in addition to the polymerization initiator and other components. The heavy metal ion herein means an ion of a metal with a specific gravity of 4 g/cm$^3$ or more.

Specific examples of the heavy metal ion may be the same as those described in WO 2010/024448. Each of these heavy metal ions may be used alone, or two or more of these may be used. Preferred among these is iron.

The heavy metal ion may have any ionic valence. When the heavy metal is iron, the iron ion in the initiator may be $Fe^{2+}$, $Fe^{3+}$, or a combination of these, for example.

When the heavy metal ion is an iron ion, the heavy metal salt is preferably, for example, Mohr's salt ($Fe(NH_4)_2(SO_4)_2 \cdot 6H_2O$), ferrous sulfate heptahydrate, ferrous chloride, or ferric chloride.

The amount of the heavy metal ion is preferably 0.1 to 10 ppm based on the total mass of the polymerization reaction liquid at the end of the polymerization reaction (or after neutralization, when the neutralization is conducted after the polymerization reaction). When the amount of the heavy metal ion is 0.1 ppm or more, the effects of the heavy metal ion are more sufficiently imparted. When the amount of the heavy metal ion is 10 ppm or less, a copolymer with excellent color tone can be obtained.

The preferred range of the weight average molecular weight of the carboxyl group-containing copolymer produced by the method according to the second aspect of the present invention is the same as that of the carboxyl group-containing copolymer according to the first aspect of the present invention.

<Applications of Carboxyl Group-Containing Copolymer>

The carboxyl group-containing copolymer of the present invention may be used for coagulants, flocculants, printing inks, adhesives, soil conditioners (soil reforming agents), flame retardants, skin care products, hair care products, additives for shampoo, hair sprays, and cosmetics, anion exchange resins, dye mordants and aids for fibers and photo films, pigment spreading agents used in papermaking, paper strengthening agents, antiseptic agents, softening agents for fabrics and paper, additives for lubricants, water treatment agents, fiber treatment agents, dispersants, scale inhibitors (agents for scale prevention), sequestrants, thickeners, various binders, emulsifiers, cleaners, and detergents.

The carboxyl group-containing copolymer of the present invention can exhibit good properties when used for applications in aqueous systems and have good properties such as hard water resistance, a clay dispersing ability, and interaction with surfactants. Thus, the carboxyl group-containing copolymer can exhibit better properties especially when used in scale inhibitors, cleaners, or detergents.

<Scale Inhibitor>

The carboxyl group-containing copolymer of the present invention may be used in scale inhibitors.

That is, the present invention also relates to a scale inhibitor containing the carboxyl group-containing copolymer of the present invention.

The scale inhibitor may optionally contain other additives such as polymerized phosphates, phosphonates, anticorrosives, slime control agents, and chelating agents, if needed.

The scale inhibitor is useful for preventing the formation of scale in a cooling water circulation system, a boiler water circulation system, a seawater desalination plant, a pulp digester, or a black liquor concentrating kettle, for example. The scale inhibitor may optionally contain an appropriate water-soluble polymer as long as the properties and the effects are not affected.

<Cleaner, Detergent>

The carboxyl group-containing copolymer of the present invention may be used in detergent builders or detergent compositions (cleaner compositions). That is, the present invention also relates to a detergent builder or detergent composition containing the carboxyl group-containing copolymer.

The detergent builder or detergent composition can be used as various detergents for clothing, kitchen (dishes), household, hair, body, toothpaste, and automobiles, for example. The detergent builder or detergent composition is preferably used as detergents for clothing or kitchen, more preferably used as detergents for laundry or kitchen. Examples of kitchen detergents include hand dishwashing detergents and automatic dishwasher detergents.

The detergent composition may contain any amount of the carboxyl group-containing copolymer. To achieve excellent properties as a builder, the amount of the carboxyl group-containing copolymer is preferably 0.1% to 15% by mass, more preferably 0.3% to 10% by mass, still more preferably 0.5% to 5% by mass based on the total amount of the detergent composition.

The detergent composition used as detergents usually contains a surfactant and/or an additive for detergents. The specifications of the surfactant and additive, which are not limited, refer to common knowledge in the detergent field appropriately. The detergent composition may also be a powder detergent composition or a liquid detergent composition.

The surfactant is one or two or more of surfactants selected from the group consisting of anionic surfactants, nonionic surfactants, cationic surfactants, and amphoteric surfactants. When two or more of surfactants are used in combination, the total amount of the anionic surfactant and the nonionic surfactant is preferably 50% by mass or more, more preferably 60% by mass or more, still more preferably 70% by mass or more, particularly preferably 80% by mass or more based on the amount of all surfactants.

Suitable examples of the anionic surfactants include alkylbenzenesulfonates, alkylethersulfates, alkenylethersulfates, alkylsulfates, alkenylsulfates, α-olefin sulfonates, α-sulfonated fatty acid and esters thereof, alkanesulfonates, saturated fatty acid salts, unsaturated fatty acid salts, alkylethercarboxylates, alkenylethercarboxylates, amino acid-based surfactants, N-acylamino acid-based surfactants, alkylphosphoric acid esters, salts of alkylphosphoric acid esters, alkenylphosphoric acid esters, and salts of alkenylphosphoric acid esters. The alkyl group or alkenyl group of any of these anionic surfactants may contain an alkyl group such as a methyl group as a branch.

Suitable examples of the nonionic surfactants include polyoxyalkylenealkylethers, polyoxyalkylenealkenylethers, polyoxyethylenealkylphenylethers, higher fatty acid alkanolamides, alkylene oxide adducts of higher fatty acid alkanolamides, sucrose fatty acid esters, alkyl glycoxides, fatty acid glycerol monoesters, and alkylamine oxides. The alkyl group or alkenyl group of any of these nonionic surfactants may contain an alkyl group such as a methyl group as a branch.

Suitable examples of the cationic surfactants include quaternary ammonium salts. Suitable examples of the amphoteric surfactants include carboxylic amphoteric surfactants and sulfobetaine amphoteric surfactants. The alkyl group or alkenyl group of any of these cationic surfactanst or any of these amphoteric surfactants may contain an alkyl group such as a methyl group as a branch.

The proportion of the surfactant in the total amount of the detergent composition is typically 10% to 60% by mass, preferably 15% to 50% by mass, more preferably 20% to 45% by mass, particularly preferably 25% to 40% by mass. A detergent composition containing too small an amount of the surfactant may not exhibit sufficient washing properties, whereas a detergent composition containing too large an amount of the surfactant may be disadvantageous in terms of cost.

Suitable examples of the additive include antiredeposition agents for preventing redeposition of pollutants (e.g., an alkali builder, a chelate builder, sodium carboxymethyl cellulose), anti-fouling agents (e.g., benzotriazol, ethylenethiourea), soil release agents, dye transfer inhibitors, softening agents, alkaline substances for pH regulation, perfumes, solubilizing agents, fluorescence agents, colorants, frothing agents, foam stabilizers, lustering agents, germicides, bleaching agents, bleaching assistants, enzymes, dyes, and solvents. When the detergent composition is powder, it preferably contains zeolite.

The detergent composition may optionally contain a different detergent builder in addition to the carboxyl group-containing copolymer of the present invention. Non-limiting examples of the different detergent builder include alkali builders such as carbonates, hydrogencarbonates, and silicates; chelate builders such as tripolyphosphates, pyrophosphates, Glauber's salt, nitrilotriacetates, ethylenediaminetetraacetates, citrates, salts of (meth)acrylic acid copolymers, acrylic acid-maleic acid copolymers, fumarates, and zeolite; and carboxyl derivatives of polysaccharides such as carboxymethyl cellulose. Examples of counter salts used with these builders include alkaline metals such as sodium and potassium, ammonium, and amines.

Typically, the sum of the proportions of the additive and the different detergent builder blended is preferably 0.1% to 50% by mass, more preferably 0.2% to 40% by mass, still more preferably 0.3% to 35% by mass, particularly preferably 0.4% to 30% by mass, most preferably 0.5% to 20% by mass based on 100% by mass of the detergent composition. A detergent composition in which the sum of the proportions of the additive and the different detergent is less than 0.1% by mass may not have sufficient properties as a detergent, whereas a detergent composition in which the sum of the proportions of the additive and the different detergent is more than 50% by mass is disadvantageous in terms of cost.

When the detergent composition is a liquid detergent composition, the amount of water in the liquid detergent composition is typically preferably 0.1% to 75% by mass, more preferably 0.2% to 70% by mass, still more preferably 0.5% to 65% by mass, even more preferably 0.7% to 60% by mass, particularly preferably 1% to 55% by mass, most preferably 1.5% to 50% by mass based on the total amount of the liquid detergent composition.

Suitable examples of enzymes that can be mixed in the detergent composition include proteases, lipases, and cellulases. Preferred among these are proteases, alkali lipases, and alkali cellulases because of their high activity in an alkaline cleaning liquid.

The amount of the enzyme is preferably 5% by mass or less based on 100% by mass of the detergent composition. When the amount of the enzyme is more than 5% by mass, the washing properties are not enhanced any more, and such an amount may be disadvantageous in terms of cost.

The detergent composition causes less deposition of salts and exhibits excellent washing properties even when used in a hard water area at which the concentration of calcium ions or magnesium ions is high (e.g., 100 mg/L or more). Such effects are remarkably exhibited by the detergent composition containing an anionic surfactant such as LAS.

Advantageous Effects of Invention

The carboxyl group-containing copolymer according to the first aspect of the present invention having the above-described features has an excellent calcium ion trapping ability, and thus can be suitably used for scale inhibitors, for example. The method for producing a carboxyl group-containing copolymer according to the second aspect of the present invention including copolymerizing an unsaturated dicarboxylic acid monomer and a hydrophobic group-containing cationic monomer having the above-described features enables the reaction of the hydrophobic group-containing cationic monomer with a high reaction ratio. The resulting copolymer has an excellent calcium ion trapping ability and an excellent carbon black dispersing ability, and thus can be suitable for agents such as scale inhibitors, cleaners, and detergents.

DESCRIPTION OF EMBODIMENTS

The present invention is described in further detail below with reference to examples, but the present invention is not limited to these examples. It should be noted that the terms "part(s)" and "%" refer to "part(s) by weight" and "mass %", respectively, unless otherwise stated.

The following parameters were determined or quantified by the methods described later.
(1) Weight average molecular weight (Mw)
(2) Ca trapping ability
(3) Carbon black dispersing ability
(4) Anti-redeposition properties
(5) Beef tallow dispersing ability (1) Measurement of Weight Average Molecular Weight (Mw)

Apparatus: high performance GPC apparatus (HLC-8320GPC) produced by Tosoh Corporation
Detector: RI
Column: SHODEX Asahipak GF-310-HQ, GF-710-HQ, GF-1G 7B produced by Showa Denko K.K.
Column temperature: 40° C.
Flow rate: 0.5 ml/min
Calibration curve: POLYACRYLIC ACID STANDARD produced by Sowa Kagaku Co., Ltd.
Eluent: 0.1 N sodium acetate/acetonitrile=3/1 (mass ratio)

(2) Measurement of Ca Trapping Ability

First, 50 g of a 0.01 mol/L, 0.001 mol/L, or 0.0001 mol/L aqueous solution was prepared as a calcium ion standard solution for a calibration curve using calcium chloride dehydrate. The pH of the aqueous solution was adjusted to 9 to 11 with a 48% aqueous solution of NaOH. Then, 1 mL of a 4 mol/L aqueous solution of potassium chloride (hereinafter, abbreviated as 4M-KCl aqueous solution) was added to the aqueous solution, and the contents were sufficiently stirred with a magnetic stirrer. Thereby, a sample solution for a calibration curve was prepared. Separately, a needed amount (50 g per sample) of a 0.001 mol/L aqueous solution was prepared as a calcium ion standard test solution using calcium chloride dehydrate. Then, 10 mg (in terms of solids) of a test sample (polymer) was weighed in a 100 cc beaker, and 50 g of the calcium ion standard test solution was added thereto. The contents were sufficiently stirred with a magnetic stirrer. The pH of the solution was adjusted to 9 to 11 with a 48% aqueous solution of NaOH, and 1 mL of a 4M-KCl aqueous solution was added thereto. Thereby, a test sample solution was prepared similarly to the sample solution for a calibration curve. The thus-prepared sample solution for a calibration curve and the test sample solution were subjected to measurement using a titrator COMTITE-550 produced by Hiranuma Sangyo Co., Ltd. with a calcium ion electrode 93-20 and a reference electrode 90-01 produced by Orion Corp. The amount of calcium ions trapped by the sample (polymer) was determined from the values obtained from the measurement for the sample solutions for calibration curve and the test sample solution. The resulting value was converted to the amount trapped by 1 g of the solids of the polymer. The amount was expressed as the number of milligrams in terms of calcium carbonate (mgCaCO$_3$/g). The resulting value is defined as the calcium ion trapping ability.

(3) Measurement of Carbon Black Dispersing Ability

A buffer solution and a 0.1% aqueous polymer solution were prepared. The buffer solution was prepared in the following way: pure water was added to 6.76 g of glycine, 5.26 g of sodium chloride, and 0.50 g of 48% sodium hydroxide to prepare 60.0 g of a solution in total; and to the solution were added 0.123 g of calcium chloride dihydrate, 0.056 g of magnesium chloride hexahydrate, and pure water to prepare 1000.0 g of the buffer solution. The 0.1% aqueous polymer solution was prepared by diluting one of the polymers obtained in Examples 1 to 8 and Comparative Examples 1 to 7 with an appropriate amount of water to a solids concentration of 0.1% by mass.

Next, the solutions and carbon black powder were put into a 30-mL test tube in the following order and amounts. First, 0.03 g of carbon black powder was added, then 27.0 g of the buffer solution was added, and finally 3.0 g of the 0.1% aqueous polymer solution was added.

After the addition of the solutions and the carbon black powder in the stated order, the test tube was sealed and slowly inverted 60 times so that the contents were stirred. Thereafter, the test tube was allowed to stand at room temperature for 20 hours. Immediately after 20 hours, the supernatant was put into a 1-cm quartz cell, and the absorbance at a UV wavelength of 380 nm thereof was measured using a spectrophotometer (measurement apparatus: UV-1800 produced by Shimadzu Corporation). The resulting value is defined as the carbon black dispersing ability. A higher absorbance indicates a better dispersion of the carbon black powder.

(4) Measurement of Anti-Redeposition Properties

The reflectances as whiteness of white cotton fabrics and white cotton/polyester blend fabrics used as samples were previously measured. The reflectance may be measured using a colorimetric difference meter ND-1001DP produced by Nippon Denshoku Industries Co., Ltd., for example. Pure water was added to 1.47 g of calcium chloride dihydrate to prepare 10 kg of hard water. Pure water was added to 4.0 g of sodium linear alkylbenzenesulfonate (LAS) to prepare 100 g of a 4% aqueous surfactant solution. A tergotmeter was set at 25° C., and 1000 mL of the hard water and 5.0 g of an aqueous polymer solution (concentration 1.0%) were put into a pot. The contents were stirred for one minute. Thereafter, 5.0 g of the 4% aqueous surfactant solution and 0.5 g of clay (JIS test powder 1 Class 11) were put into the pot. The contents were stirred at 100 rpm for one minute. Then, 5.0 g of the white fabric was put in the pot and stirred at 100 rpm for 10 minutes. The white fabric was wrung by hand, and put in a pot with 1 L of the hard water. The contents were stirred at 100 rpm for two minutes. The white fabric was again wrung by hand and dried with an iron while wrinkles were smoothed with a filler cloth placed therebetween. The reflectance as whiteness of the fabric was measured again using the colorimetric difference meter. The anti-soil redeposition properties were determined from the following equation, based on the measurement results. Anti-redeposition properties (%)=(Whiteness of fabric after washing)/(Whiteness of original white fabric)×100

(5) Measurement of Beef Tallow Dispersing Ability

First, pure water was added to 0.123 g of calcium chloride dihydrate and 0.056 g of magnesium chloride hexahydrate to prepare 1000.0 g of hard water. Separately, pure water was added to 83.3 g of 25% sodium polyoxyethylene lauryl ether sulfate and 11.9 g of 35% lauryl dimethylamine oxide up to 100.0 g and the mixture was stirred to prepare a 25% aqueous surfactant solution having a ratio of sodium polyoxyethylene lauryl ether sulfate:lauryl dimethylamine oxide=5:1. Then, the hard water was added to an aqueous polymer solution having a solid content of 2 mg and 0.20 g of the 25% aqueous surfactant solution prepared as described above to prepare 20 g of a composition for cleaning.

A 50-mL glass screw tube was charged with 0.10 g of beef tallow and 20 g of the composition for cleaning prepared as described above, and the contents were stirred and then allowed to stand at 25° C. for six hours. Immediately after six hours, the supernatant was put into a 1 cm quartz cell, and the absorbance at a UV wavelength of 380 nm thereof was measured using a spectrophotometer. The resulting value is defined as the beef tallow dispersing ability. A higher absorbance indicates a better beef tallow dispersing ability.

Example 1

Synthesis of Monomer

The following describes a method for synthesizing a dibutylamine derivative monomer of allyl glycidyl ether (AGE) (AGE-DBA).

A 2000 mL four-necked glass flask equipped with a reflux condenser and a stirrer (paddle blades) was charged with 319.9 g of pure water and 387.0 g of dibutylamine, and the contents were heated to 60° C. under stirring. Then, 359.5 g of AGE was added over 60 minutes, and the contents were reacted for five hours. The resulting monomer was washed with pure water and saturated saline, and the water layer was removed with a separatory funnel. Water in the organic layer was sufficiently removed with sodium sulfate, and the sodium sulfate was removed by filtration. Thus, 100% AGE-DBA was obtained.

Synthesis of Polymer

A 500-mL glass separable flask equipped with a reflux condenser and a stirrer was charged with 27.7 g of pure water and 29.4 g (0.30 mol) of maleic anhydride, and the contents were heated to 90° C. under stirring. After the heating, 14.0 g (0.17 mol) of 48% sodium hydroxide (hereinafter, abbreviated as 48% NaOH) and 6.6 mg of Mohr's salt were added thereto. After the addition, the solution had a pH of 0.4. Subsequently, 75.7 g (0.84 mol) of a 80% aqueous solution of acrylic acid (hereinafter, abbreviated as 80% AA), 17.1 g (0.06 mol) of an addition reaction product of allyl glycidyl ether (AGE) with dibutylamine (hereinafter, abbreviated as AGE-DBA), 48.0 g (6.0 g per mole of the monomers added (here, the monomers added refer to all the monomers added, and the same shall apply to the following examples and comparative examples)) of a 15% aqueous solution of sodium persulfate (hereinafter, abbreviated as 15% NaPS), and 29.5 g (8.0 g per mole of the monomers added) of a 32.5% aqueous solution of sodium bisulfite (hereinafter, abbreviated as 32.5% SBS) were added dropwise to the polymerization reaction system through different nozzles under stirring. The addition times of these components were as follows: 80% AA and AGE-DBA were each added over 120 minutes, 15% NaPS was added over 150 minutes, and 32.5% SBS was added over 110 minutes. During the addition, each component was continuously added dropwise at a constant rate. After the dropwise addition, the reaction solution was further maintained at 90° C. and aged for 60 minutes to complete the polymerization. The reaction solution immediately after the completion of the polymerization had a pH of 2.0. After the completion of the polymerization, the reaction solution was cooled and neutralized by gradually adding dropwise 46.0 g (i.e., 0.55 mol) of 48% NaOH to the reaction solution under stirring. Thus, a polymer (1) having a solids concentration of 46 mass % and a final degree of neutralization of 52 mol % was obtained. The reaction ratio of AGE-DBA was 98%. The polymer (1) had a Mw of 9500, a Ca trapping ability of 294, and a carbon black dispersing ability of 0.77.

Example 2

A 2.5 L stainless steel separable flask equipped with a reflux condenser and a stirrer was charged with 110.0 g of pure water and 216.2 g (2.205 mol) of maleic anhydride, and the contents were heated to 100° C. under stirring. After the heating, 155.0 g (1.86 mol) of 48% NaOH, 133.5 g (0.245 mol) of a 40% aqueous solution of sodium 3-allyloxy-2-hydroxypropanesulfonate (hereinafter, abbreviated as 40% HAPS), and 59.63 g (0.245 mol) of AGE-DBA were added thereto. After the addition, the solution had a pH of 4.8. Subsequently, 198.6 g (2.205 mol) of 80% AA, 183.8 g (2.205 mol) of 48% NaOH, 98.0 g (3.0 g per mole of the monomers added) of 15% NaPS, 33.6 g (2.4 g per mole of the monomers added) of a 35% aqueous solution of hydrogen peroxide (hereinafter, abbreviated as 35% $H_2O_2$), and 173.9 g of pure water were added dropwise to the polymerization reaction system through different nozzles under stirring. The addition times of these components were as follows: 80% AA, 48% NaOH, and pure water were each added over 120 minutes, 15% NaPS was added over 150 minutes, and 35% $H_2O_2$ was added over 90 minutes. During the addition, each component was continuously added dropwise at a constant rate. The reaction solution had a pH of 5.2, 5.4, 5.7, 5.9, and 6.0 respectively after 30, 60, 90, 120, and 150 minutes from the start of dropwise addition.

After the dropwise addition, the reaction solution was further maintained at 100° C. and aged for 35 minutes to complete the polymerization. The reaction solution immediately after the completion of the polymerization had a pH of 6.0. After the completion of the polymerization, the reaction solution was cooled and neutralized by gradually adding dropwise 57.4 g (i.e., 0.69 mol) of 48% NaOH to the reaction solution under stirring. Thus, a polymer (2) having a solids concentration of 49 mass % and a final degree of neutralization of 78 mol % was obtained. The reaction ratio of AGE-DBA was 92%. The polymer (2) had a Mw of 10200, a Ca trapping ability of 363, and a carbon black dispersing ability of 0.58.

Example 3

A 500-mL glass separable flask equipped with a reflux condenser and a stirrer was charged with 36.1 g of pure water and 29.4 g (0.30 mol) of maleic anhydride, and the contents were heated to 90° C. under stirring. After the heating, 14.0 g (0.17 mol) of 48% NaOH and 6.0 mg of Mohr's salt were added thereto. After the addition, the solution had a pH of 0.4. Subsequently, 65.3 g (0.72 mol) of 80% AA, 29.0 g (0.12 mol) of AGE-DBA, 48.0 g (6.0 g per mole of the monomers added) of 15% NaPS, and 29.5 g (6.0 g per mole of the monomers added) of 35% SBS were added dropwise to the polymerization reaction system through different nozzles under stirring. The addition times of these components were as follows: 80% AA was added over 150 minutes, AGE-DBA was added over 120 minutes, 15% NaPS was added over 180 minutes, and 35% SBS was added over 150 minutes. During the addition, each component was continuously added dropwise at a constant rate.

After the dropwise addition, the reaction solution was further maintained at 90° C. and aged for 30 minutes to complete the polymerization. The reaction solution immediately after the completion of the polymerization had a pH of 2.3. After the completion of the polymerization, the reaction solution was cooled and neutralized by gradually adding dropwise 41.2 g (i.e., 0.49 mol) of 48% NaOH to the reaction solution under stirring. Thus, a polymer (3) having a solids concentration of 38 mass % and a final degree of neutralization of 50 mol % was obtained. The reaction ratio of AGE-DBA was 96%. The polymer (3) had a Mw of 8600, a Ca trapping ability of 462, and a carbon black dispersing ability of 1.00.

Example 4

A 500-mL glass separable flask equipped with a reflux condenser and a stirrer was charged with 40.9 g of pure water and 39.0 g (0.30 mol) of itaconic acid, and the contents were heated to 90° C. under stirring. After the heating, 14.0 g (0.17 mol) of 48% NaOH and 7.0 mg of Mohr's salt were added thereto. After the addition, the solution had a pH of 0.7. Subsequently, 83.6 g (0.93 mol) of 80% AA, 19.6 g (0.08 mol) of AGE-DBA, 52.4 g (6.0 g per mole of the monomers added) of 15% NaPS, and 22.4 g (6.0 g per mole of the monomers added) of 35% SBS were added dropwise to the polymerization reaction system through different nozzles under stirring. The addition times of these components were as follows: 80% AA and AGE-DBA were each added over 120 minutes, 15% NaPS was added over 150 minutes, and 35% SBS was added over 120 minutes. During the addition, each component was continuously added dropwise at a constant rate.

After the dropwise addition, the reaction solution was further maintained at 90° C. and aged for 60 minutes to complete the polymerization. The reaction solution immediately after the completion of the polymerization had a pH of 3.0. After the completion of the polymerization, the reaction solution was cooled and neutralized by gradually adding dropwise 49.7 g (i.e., 0.60 mol) of 48% NaOH to the reaction solution under stirring. Thus, a polymer (4) having a solids concentration of 39 mass % and a final degree of neutralization of 50 mol % was obtained. The reaction ratio of AGE-DBA was 90%. The polymer (4) had a Mw of 34400, a Ca trapping ability of 283, and a carbon black dispersing ability of 1.56.

Example 5

Synthesis of Monomer

The following describes a method for synthesizing an iminodiacetic acid derivative monomer of AGE (AGE-IDA).

A 1000 mL four-necked glass flask equipped with a reflux condenser and a stirrer (paddle blades) was charged with 151.7 g of pure water, 119.8 g of iminodiacetic acid, and 150.0 g of 48% NaOH, and the contents were heated to 60° C. under stirring. Then, 102.7 g of AGE was added over 60 minutes, and the contents were reacted for five hours. Thus, 50% AGE-IDA was obtained.

Synthesis of Polymer

A 500-mL glass separable flask equipped with a reflux condenser and a stirrer was charged with 30.0 g of pure water and 34.3 g (0.35 mol) of maleic anhydride, and the contents were heated to 90° C. under stirring. After the heating, 16.3 g (0.20 mol) of 48% NaOH and 6.2 mg of Mohr's salt were added thereto. After the addition, the solution had a pH of 0.4. Subsequently, 87.0 g (1.0 mol) of 80% AA, 48.0 g (0.08 mol) of 50% AGE-IDA, 55.9 g (6.0 g per mole of the monomers added) of 15% NaPS, and 32.0 g (8.0 g per mole of the monomers added) of 35% SBS were added dropwise to the polymerization reaction system through different nozzles under stirring. The addition times of these components were as follows: 80% AA and 50% AGE-IDA were each added over 120 minutes, 15% NaPS was added over 150 minutes, and 35% SBS was added over 110 minutes. During the addition, each component was continuously added dropwise at a constant rate.

After the dropwise addition, the reaction solution was further maintained at 90° C. and aged for 60 minutes to complete the polymerization. The reaction solution immediately after the completion of the polymerization had a pH of 2.1. After the completion of the polymerization, the reaction solution was cooled and neutralized by gradually adding dropwise 53.1 g (i.e., 0.64 mol) of 48% NaOH to the reaction solution under stirring. Thus, a polymer (5) having a solids concentration of 48 mass % and a final degree of neutralization of 50 mol % was obtained. The reaction ratio of AGE-IDA was 92%. The polymer (5) had a Mw of 17000, a Ca trapping ability of 328, and a carbon black dispersing ability of 0.50.

Example 6

Synthesis of Monomer

The following describes a method for synthesizing a diethanolamine derivative monomer of AGE (AGE-DEA).

A 1000 mL four-necked glass flask equipped with a reflux condenser and a stirrer (paddle blades) was charged with 235.9 g of diethanolamine, and the diethanolamine was heated to 60° C. under stirring. Then, 251.1 g of AGE was added over 60 minutes, and the contents were reacted for five hours. Thus, 100% AGE-DEA was obtained.

Synthesis of Polymer

A 500-mL glass separable flask equipped with a reflux condenser and a stirrer was charged with 32.0 g of pure water and 34.3 g (0.35 mol) of maleic anhydride, and the contents were heated to 90° C. under stirring. After the heating, 16.3 g (0.20 mol) of 48% NaOH and 6.2 mg of Mohr's salt were added thereto. After the addition, the solution had a pH of 0.4. Subsequently, 87.0 g (1.0 mol) of 80% AA, 25.5 g (0.09 mol) of 80% AGE-DEA, 56.4 g (6.0 g per mole of the monomers added) of 15% NaPS, and 32.2 g (8.0 g per mole of the monomers added) of 35% SBS were added dropwise to the polymerization reaction system through different nozzles under stirring. The addition times of these components were as follows: 80% AA and 80% AGE-DEA were each added over 120 minutes, 15% NaPS was added over 150 minutes, and 35% SBS was added over 110 minutes. During the addition, each component was continuously added dropwise at a constant rate.

After the dropwise addition, the reaction solution was further maintained at 90° C. and aged for 60 minutes to complete the polymerization. The reaction solution immediately after the completion of the polymerization had a pH of 2.0. After the completion of the polymerization, the reaction solution was cooled and neutralized by gradually adding dropwise 53.1 g (i.e., 0.64 mol) of 48% NaOH to the reaction solution under stirring. Thus, a polymer (6) having a solids concentration of 48 mass % and a final degree of neutralization of 50 mol % was obtained. The reaction ratio of AGE-DEA was 96%. The polymer (6) had a Mw of 10200, a Ca trapping ability of 281, and a carbon black dispersing ability of 0.34.

Example 7

Synthesis of Monomer

The following describes a method for synthesizing a trimethylamine derivative monomer of AGE (AGE-TMA).

A 1000 mL four-necked glass flask equipped with a reflux condenser and a stirrer (paddle blades) was charged with 104.9 g of pure water and 191.1 g of a trimethylamine hydrochloride, and the contents were heated to 50° C. under stirring. Then, 228.3 g of AGE was added over 120 minutes, and the contents were reacted for two hours. Thus, 80% AGE-TMA was obtained.

Synthesis of Polymer

A 500-mL glass separable flask equipped with a reflux condenser and a stirrer was charged with 36.2 g of pure water and 29.4 g (0.30 mol) of maleic anhydride, and the contents were heated to 90° C. under stirring. After the heating, 14.0 g (0.17 mol) of 48% NaOH and 5.2 mg of Mohr's salt were added thereto. After the addition, the solution had a pH of 0.4. Subsequently, 74.6 g (0.8 mol) of 80% AA, 21.8 g (0.08 mol) of 80% AGE-TMA, 48.4 g (6.0 g per mole of the monomers added) of 15% NaPS, and 13.8 g (4.0 g per mole of the monomers added) of 35% SBS were added dropwise to the polymerization reaction system through different nozzles under stirring. The addition times of these components were as follows: 80% AA and 80% AGE-TMA were each added over 120 minutes, 15% NaPS was added over 150 minutes, and 35% SBS was added over 110 minutes. During the addition, each component was continuously added dropwise at a constant rate.

After the dropwise addition, the reaction solution was further maintained at 90° C. and aged for 60 minutes to complete the polymerization. The reaction solution immediately after the completion of the polymerization had a pH of 1.9. After the completion of the polymerization, the reaction solution was cooled and neutralized by gradually adding dropwise 45.5 g (i.e., 0.55 mol) of 48% NaOH to the reaction solution under stirring. Thus, a polymer (7) having a solids concentration of 47 mass % and a final degree of neutralization of 50 mol % was obtained. The reaction ratio of AGE-TMA was 98%. The polymer (7) had a Mw of 8500, a Ca trapping ability of 294, and a carbon black dispersing ability of 0.20.

Example 8

A 500-mL glass separable flask equipped with a reflux condenser and a stirrer was charged with 68.0 g of pure water and 53.9 g (0.55 mol) of maleic anhydride, and the contents were heated to 100° C. under stirring. After the heating, 36.7 g (0.44 mol) of 48% NaOH and 5.2 mg of Mohr's salt were added thereto. After the addition, the solution had a pH of 0.4. Subsequently, 49.5 g (0.5 mol) of 80% AA, 41.2 g (0.06 mol) of a 33% aqueous solution of sodium 2-acrylamide-2-methylpropane sulfonate (hereinafter, abbreviated as 33% AMPS), 14.9 g (0.06 mol) of AGE-DBA, 28.6 g (3.5 g per mole of the monomers added) of 15% NaPS, and 10.5 g (3.0 g per mole of the monomers added) of 35% $H_2O_2$ were added dropwise to the polymerization reaction system through different nozzles under stirring. The addition times of these components were as follows: 80% AA and 33% AMPS were each added over 150 minutes, 15% NaPS was added over 180 minutes, and AGE-DBA and 35% $H_2O_2$ were each added over 120 minutes. During the addition, each component was continuously added dropwise at a constant rate.

After the dropwise addition, the reaction solution was further maintained at 100° C. and aged for 60 minutes to complete the polymerization. The reaction solution immediately after the completion of the polymerization had a pH of 2.3. After the completion of the polymerization, the reaction solution was cooled and neutralized by gradually adding dropwise 32.1 g (i.e., 0.38 mol) of 48% NaOH to the reaction solution under stirring. Thus, a polymer (8) having a solids concentration of 46 mass % and a final degree of neutralization of 50 mol % was obtained. The reaction ratio of AGE-DBA was 93%. The polymer (8) had a Mw of 7700, a Ca trapping ability of 312, and a carbon black dispersing ability of 0.56.

Comparative Example 1

A 1.0 L glass separable flask equipped with a reflux condenser and a stirrer was charged with 100.0 g of pure water, and the water was heated to 70° C. under stirring. After the heating, 4.3 mg of Mohr's salt was added. Subsequently, 189.0 g (2.10 mol) of 80% AA, 50.4 g (0.21 mol) of AGE-DBA, 92.3 g (6.0 g per mole of the monomers added) of 15% NaPS, and 62.6 g (9.5 g per mole of the monomers added) of a 35% aqueous solution of sodium bisulfite (hereinafter, abbreviated as 35% SBS) were added dropwise to the polymerization reaction system through different nozzles under stirring. The addition times of these components were as follows: 80% AA and 35% SBS were each added over 180 minutes, AGE-DBA was added over 170 minutes, and 15% NaPS was added over 190 minutes. During the addition, each component was continuously added dropwise at a constant rate.

After the dropwise addition, the reaction solution was further maintained at 70° C. and aged for 30 minutes to complete the polymerization. After the completion of the polymerization, the reaction solution was cooled and neutralized by gradually adding dropwise 122.5 g (i.e., 1.47 mol) of 48% NaOH to the reaction solution under stirring. Thus, a polymer (9) having a solids concentration of 44 mass % and a final degree of neutralization of 70 mol % was obtained. The polymer (9) had a Mw of 14700, a Ca trapping ability of 185, and a carbon black dispersing ability of 1.15.

Comparative Example 2

A 1.0 L glass separable flask equipped with a reflux condenser and a stirrer was charged with 100.0 g of pure water, and the water was heated to 85° C. under stirring. After the heating, 13.3 mg of Mohr's salt was added. Subsequently, 183.8 g (2.04 mol) of 80% AA, 60.6 g (0.112 mol) of 40% HAPS, 42.0 g (0.173 mol) of AGE-DBA, 93.0 g (6.0 g per mole of the monomers added) of 15% NaPS, and 39.9 g (6.0 g per mole of the monomers added) of 35% SBS were added dropwise to the polymerization reaction system through different nozzles under stirring. The addition times of these components were as follows: 80% AA was added over 180 minutes, 40% HAPS and AGE-DBA were each added over 120 minutes, 15% NaPS was added over 210 minutes, and 35% SBS was added over 175 minutes. During the addition, each component was continuously added dropwise at a constant rate.

After the dropwise addition, the reaction solution was further maintained at 85° C. and aged for 30 minutes to complete the polymerization. After the completion of the polymerization, the reaction solution was cooled and neutralized by gradually adding dropwise 111.7 g (i.e., 1.34 mol) of 48% NaOH to the reaction solution under stirring. Thus, a polymer (10) having a solids concentration of 42 mass % and a final degree of neutralization of 70 mol % was obtained. The polymer (10) had a Mw of 9400, a Ca trapping ability of 144, and a carbon black dispersing ability of 1.28.

Comparative Example 3

A 1.0 L glass separable flask equipped with a reflux condenser and a stirrer was charged with 100.0 g of pure water, and the water was heated to 85° C. under stirring. After the heating, 14.1 mg of Mohr's salt was added. Subsequently, 210.0 g (2.33 mol) of 80% AA, 60.6 g (0.112 mol) of 40% HAPS, 21.0 g (0.112 mol) of a normal butanol adduct of allyl glycidyl ether (hereinafter, abbreviated as AGE-BuOH), 102.3 g (6.0 g per mole of the monomers added) of 15% NaPS, and 43.8 g (6.0 g per mole of the monomers added) of 35% SBS were added dropwise to the polymerization reaction system through different nozzles under stirring. The addition times of these components were as follows: 80% AA was added over 180 minutes, 40% HAPS and AGE-BuOH were each added over 120 minutes, 15% NaPS was added over 210 minutes, and 35% SBS was added over 175 minutes. During the addition, each component was continuously added dropwise at a constant rate.

After the dropwise addition, the reaction solution was further maintained at 85° C. and aged for 30 minutes to complete the polymerization. After the completion of the polymerization, the reaction solution was cooled and neutralized by gradually adding dropwise 128.8 g (i.e., 1.55 mol) of 48% NaOH to the reaction solution under stirring. Thus, a polymer (11) having a solids concentration of 42 mass % and a final degree of neutralization of 70 mol % was obtained. The polymer (11) had a Mw of 7200, a Ca trapping ability of 185, and a carbon black dispersing ability of 0.90.

Comparative Example 4

A 500-mL glass separable flask equipped with a reflux condenser and a stirrer was charged with 89.8 g of pure water, and the water was heated to 85° C. under stirring. After the heating, 7.0 mg of Mohr's salt was added. Subsequently, 126.1 g (1.40 mol) of 80% AA, 17.8 g (0.07 mol) of AGE-DBA, 23.6 g (2.4 g per mole of the monomers added) of 15% NaPS, and 25.8 g (3.5 g per mole of the monomers added) of 20% SBS were added dropwise to the polymerization reaction system through different nozzles under stirring. The addition times of these components were as follows: 80% AA and AGE-DBA were each added over 180 minutes, 20% SBS was added over 200 minutes, and 15% NaPS was added over 210 minutes. During the addition, each component was continuously added dropwise at a constant rate.

After the dropwise addition, the reaction solution was further maintained at 85° C. and aged for 30 minutes to complete the polymerization. After the completion of the polymerization, the reaction solution was cooled and neutralized by gradually adding dropwise 70.0 g (i.e., 0.84 mol) of 48% NaOH to the reaction solution under stirring. Thus, a polymer (12) having a solids concentration of 45 mass % and a final degree of neutralization of 60 mol % was obtained. The polymer (12) had a Mw of 11400, a Ca trapping ability of 189, and a carbon black dispersing ability of 2.26.

Comparative Example 5

A 500-mL glass separable flask equipped with a reflux condenser and a stirrer was charged with 27.4 g of pure water and 29.4 g (0.30 mol) of maleic anhydride, and the contents were heated to 90° C. under stirring. After the heating, 14.0 g (0.17 mol) of 48% NaOH and 6.0 mg of Mohr's salt were added. Subsequently, 96.4 g (1.07 mol) of 80% AA, 54.8 g (6.0 g per mole of the monomers added) of 15% NaPS, and 15.7 g (4.0 g per mole of the monomers added) of 35% SBS were added dropwise to the polymerization reaction system through different nozzles under stirring. The addition times of these components were as follows: 80% AA was added over 120 minutes, 15% NaPS was added over 150 minutes, and 35% SBS was added over 120 minutes. During the addition, each component was continuously added dropwise at a constant rate.

After the dropwise addition, the reaction solution was further maintained at 90° C. and aged for 60 minutes to complete the polymerization. After the completion of the polymerization, the reaction solution was cooled and neutralized by gradually adding dropwise 69.5 g (i.e., 0.83 mol) of 48% NaOH to the reaction solution under stirring. Thus, a polymer (13) having a solids concentration of 48 mass % and a final degree of neutralization of 60 mol % was obtained. The polymer (13) had a Mw of 8200, a Ca trapping ability of 339, and a carbon black dispersing ability of 0.01.

Comparative Example 6

A 500-mL glass separable flask equipped with a reflux condenser and a stirrer was charged with 81.4 g pure water, and the water was heated to 85° C. under stirring. After the heating, 7.4 mg of Mohr's salt was added. Subsequently, 126.1 g (1.40 mol) of 80% AA, 32.4 g (0.06 mol) of 40% HAPS, 14.5 g (0.06 mol) of AGE-DBA, 24.3 g (2.4 g per mole of the monomers added) of 15% NaPS, and 26.6 g (3.5 g per mole of the monomers added) of 20% SBS were added dropwise to the polymerization reaction system through different nozzles under stirring. The addition times of these components were as follows: 80% AA was added over 180 minutes, 40% HAPS and AGE-DBA were each added over 120 minutes, 15% NaPS was added over 210 minutes, and 35% SBS was added over 180 minutes. During the addition, each component was continuously added dropwise at a constant rate.

After the dropwise addition, the reaction solution was further maintained at 85° C. and aged for 30 minutes to complete the polymerization. After the completion of the polymerization, the reaction solution was cooled and neutralized by gradually adding dropwise 70.0 g (i.e., 0.84 mol) of 48% NaOH to the reaction solution under stirring. Thus, a polymer (14) having a solids concentration of 41 mass % and a final degree of neutralization of 60 mol % was obtained. The polymer (14) had a Mw of 13200, a Ca trapping ability of 192, and a carbon black dispersing ability of 1.91.

Comparative Example 7

A 2.5 L stainless steel separable flask equipped with a reflux condenser and a stirrer was charged with 110.0 g of pure water and 216.2 g (2.20 mol) of maleic anhydride, and the contents were heated to 100° C. under stirring. After the heating, 270.0 g (3.24 mol) of 48% NaOH and 267.1 g (0.49 mol) of 40% HAPS were added. Subsequently, 198.6 g (2.20 mol) of 80% AA, 78.4 g (2.4 g per mole of the monomers added) of 15% NaPS, 28.0 g (2.0 g per mole of the monomers added) of 35% $H_2O_2$, and 147.8 g of pure water were added dropwise to the polymerization reaction system through different nozzles under stirring. The addition times of these components were as follows: 80% AA and 15%

NaPS were each added over 120 minutes, 35% $H_2O_2$ was added over 75 minutes, and pure water was added over 120 minutes. During the addition, each component was continuously added dropwise at a constant rate.

After the dropwise addition, the reaction solution was further maintained at 100° C. and aged for 35 minutes to complete the polymerization. After the completion of the polymerization, the reaction solution was cooled and neutralized by gradually adding dropwise 136.6 g (i.e., 1.64 mol) of 48% NaOH to the reaction solution under stirring. Thus, a polymer (15) having a solids concentration of 42 mass % and a final degree of neutralization of 79 mol % was obtained. The polymer (15) had a Mw of 8300, a Ca trapping ability of 367, and a carbon black dispersing ability of 0.01.

Comparative Example 8

A 2.5 L stainless steel separable flask equipped with a reflux condenser and a stirrer was charged with 110.0 g of pure water and 216.2 g (2.205 mol) of maleic anhydride, and the contents were heated to 100° C. under stirring. After the heating, 277.9 g (3.33 mol) of 48% NaOH, 133.5 g (0.245 mol) of 40% HAPS, and 59.63 g (0.245 mol) of AGE-DBA were added thereto. After the addition, the solution had a pH of 7.2. Subsequently, 198.6 g (2.205 mol) of 80% AA, 98.0 g (3.0 g per mole of the monomers added) of 15% NaPS, 33.6 g (2.4 g per mole of the monomers added) of a 35% aqueous solution of hydrogen peroxide (hereinafter, abbreviated as 35% $H_2O_2$), and 147.8 g of pure water were added dropwise to the polymerization reaction system through different nozzles under stirring. The addition times of these components were as follows: 80% AA and pure water were each added over 120 minutes, 15% NaPS was added over 150 minutes, and 35% $H_2O_2$ was added over 90 minutes. During the addition, each component was continuously added dropwise at a constant rate. The reaction solution had a pH of 5.9 both after 120 minutes and after 150 minutes from the start of dropwise addition.

After the dropwise addition, the reaction solution was further maintained at 100° C. and aged for 35 minutes to complete the polymerization. The reaction solution immediately after the completion of the polymerization had a pH of 5.9. After the completion of the polymerization, the reaction solution was cooled and neutralized by gradually adding dropwise 136.6 g (i.e., 1.64 mol) of 48% NaOH to the reaction solution under stirring. Thus, a polymer (16) having a solids concentration of 42 mass % and a final degree of neutralization of 78 mol % was obtained. The reaction ratio of AGE-DBA was 13.5%.

Table 1 shows the weight average molecular weight, the Ca trapping ability, and the carbon black dispersing ability of each of the polymers obtained in Examples 1 to 8 and Comparative Examples 1 to 7.

In Table 1, MA means maleic acid.

TABLE 1

| | | Composition of monomers | Composition ratio of monomers (wt %) | Mw | Ca trapping ability | Carbon black dispersing ability |
|---|---|---|---|---|---|---|
| Example 1 | Polymer (1) | AA/MA/AGE-DBA | 54/31/15 | 9,500 | 294 | 0.77 |
| Example 2 | Polymer (2) | AA/MA/AGE-DBA/HAPS | 30/49/11/10 | 10,200 | 363 | 0.58 |
| Example 3 | Polymer (3) | AA/MA/AGE-DBA | 45/30/25 | 8,600 | 462 | 1.00 |
| Example 4 | Polymer (4) | AA/Itaconic acid/AGE-DBA | 53/31/16 | 34,400 | 283 | 1.56 |
| Example 5 | Polymer (5) | AA/MA/AGE-IDA | 52/30/18 | 17,000 | 328 | 0.50 |
| Example 6 | Polymer (6) | AA/MA/AGE-DEA | 53/31/16 | 10,200 | 281 | 0.34 |
| Example 7 | Polymer (7) | AA/MA/AGE-TMA | 53/31/16 | 8,500 | 294 | 0.20 |
| Example 8 | Polymer (8) | AA/MA/AGE-DBA/AMPS | 30/49/11/10 | 7,700 | 312 | 0.56 |
| Comparative Example 1 | Polymer (9) | AA/AGE-DBA | 75/25 | 14,700 | 185 | 1.15 |
| Comparative Example 2 | Polymer (10) | AA/AGE-DBA/HAPS | 69/20/11 | 9,400 | 144 | 1.28 |
| Comparative Example 3 | Polymer (11) | AA/AGE-BuOH/HAPS | 79/10/11 | 7,200 | 185 | 0.90 |
| Comparative Example 4 | Polymer (12) | AA/AGE-DBA | 85/15 | 11,400 | 189 | 2.26 |
| Comparative Example 5 | Polymer (13) | AA/MA | 69/31 | 8,200 | 339 | 0.01 |
| Comparative Example 6 | Polymer (14) | AA/AGE-DBA/HAPS | 79/11/10 | 13,200 | 192 | 1.91 |
| Comparative Example 7 | Polymer (15) | AA/MA/HAPS | 30/49/21 | 8,300 | 367 | 0.01 |

The results of the examples and comparative examples demonstrate that the Ca trapping ability and the carbon black dispersing ability are both excellent in Examples 1 to 8, whereas in Comparative Examples 1 to 7, either the Ca trapping ability or the carbon black dispersing ability is excellent. Accordingly, the polymers of the present invention having the particular structure are excellent in both the Ca trapping ability and the carbon black dispersing ability.

The invention claimed is:
1. A carboxyl group-containing copolymer comprising:
   a structural unit (a) derived from an unsaturated monocarboxylic acid monomer (A),
   a structural unit (b) derived from an unsaturated dicarboxylic acid monomer (B), and
   a structural unit (c) derived from a cationic monomer (C),
      wherein the carboxyl group-containing copolymer optionally contains at least one selected from the group consisting of a structural unit (d) derived from a sulfonic acid group-containing monomer (D), and a structural unit (e) derived from a monomer (E) other than the unsaturated monocarboxylic acid monomer (A), the unsaturated dicarboxylic acid monomer (B), the cationic monomer (C), and the sulfonic acid group-containing monomer (D),
   a proportion of the structural unit (b) in 100 mol % of all structural units is 10 to 70 mol %,
   a proportion of the structural unit (e) in 100 mol % of all structural units is 0 to 20 mol %, wherein the cationic monomer (C) contains a group represented by any of the following formulas (1) to (3):

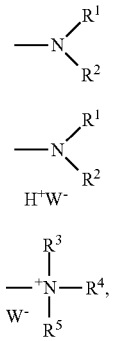

wherein in the formulas (1) and (2), $R^1$ and $R^2$ are the same as or different from each other and each represents a hydrogen atom or a C1-C20 hydrocarbon group optionally containing a functional group, at least one of $R^1$ or $R^2$ being a C1-C20 hydrocarbon group optionally containing a functional group, in the formula (3), $R^3$ to $R^5$ are the same as or different from each other and each represent a C1-C20 hydrocarbon group optionally containing a functional group, and $W^-$ is an anion.

2. The carboxyl group-containing copolymer according to claim 1, further comprising the structural unit (d) derived from a sulfonic acid group-containing monomer (D).

3. The carboxyl group-containing copolymer according to claim 1,
wherein the cationic monomer (C) contains a hydrophobic group.

4. The carboxyl group-containing copolymer according to claim 1,
wherein the unsaturated monocarboxylic acid monomer (A) includes at least one selected from the group consisting of (meth)acrylic acid and salts of (meth)acrylic acid.

5. The carboxyl group-containing copolymer according to claim 1,
wherein the unsaturated dicarboxylic acid monomer (B) includes at least one selected from the group consisting of maleic acid, salts of maleic acid, and maleic anhydride.

6. The carboxyl group-containing copolymer according to claim 1,
wherein the carboxyl group-containing copolymer has a weight average molecular weight of 2000 to 500000.

7. A scale inhibitor comprising the carboxyl group-containing copolymer according to claim 1.

8. A method for producing a carboxyl group-containing copolymer, the method comprising polymerizing a monomer component that contains an unsaturated dicarboxylic acid monomer (B) and a hydrophobic group-containing cationic monomer (C1),
wherein the monomer component optionally contains at least one selected from the group consisting of an unsaturated monocarboxylic acid monomer (A), a sulfonic acid group-containing monomer (D), and a monomer (E) other than the unsaturated monocarboxylic acid monomer (A), the unsaturated dicarboxylic acid monomer (B), the hydrophobic group-containing cationic monomer (C1), and the sulfonic acid group-containing monomer (D), a proportion of the unsaturated dicarboxylic acid monomer (B) in 100 mol % of all monomers of the monomer component is 10 to 70 mol %, a proportion of the monomer (E) in 100 mol % of all monomers is 0 to 20 mol %, wherein polymerization is conducted at a pH of 0 to 6 for at least 30% of a time, taking, from a start of the polymerization reaction to an end of a last completed addition of addition of a monomer component, addition of a chain transfer agent, and addition of a polymerization initiator, as 100%, wherein the hydrophobic group-containing cationic monomer (C1) contains a group represented by any of the following formulas (6) to (8):

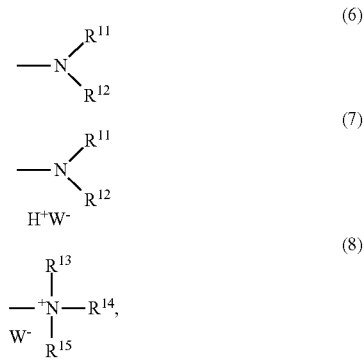

wherein in the formulas (6) and (7), $R^{11}$ and $R^{12}$ are the same as or different from each other and each represents a hydrogen atom or a C1-C20 hydrocarbon group optionally containing a functional group, at least one of $R^{11}$ or $R^{12}$ is a C1-C20 hydrocarbon group containing no functional group or containing a hydrophobic functional group, and a total carbon number of the hydrocarbon groups $R^{11}$ and $R^{12}$ is 4 or more, in the formula (8), $R^{13}$ to $R^{15}$ are the same as or different from each other and each represent a C1-C20 hydrocarbon group optionally containing a functional group, at least one of $R^{13}$ to $R^{15}$ being a C1-C20 hydrocarbon group containing no functional group or containing a hydrophobic functional group, and in the formulas (7) and (8), $W^-$ is an anion.

9. The method for producing a carboxyl group-containing copolymer according to claim 8,
wherein the unsaturated dicarboxylic acid monomer (B) includes at least one selected from the group consisting of maleic acid, salts of maleic acid, and maleic anhydride.

10. The method for producing a carboxyl group-containing copolymer according to claim 8,
wherein the monomer component contains an unsaturated monocarboxylic acid monomer (A).

11. The method for producing a carboxyl group-containing copolymer according to claim 8,
wherein the polymerization is conducted at 70° C. to 120° C.

12. The method for producing a carboxyl group-containing copolymer according to claim 8,
wherein the carboxyl group-containing copolymer has a weight average molecular weight of 2000 to 500000.

13. The method for producing a carboxyl group-containing copolymer according to claim 8,
wherein an amount of the chain transfer agent is 1 to 20 g relative to 1 mol total of the monomer component.

14. The method for producing a carboxyl group-containing copolymer according to claim 8, wherein a number of carbon atoms of the hydrocarbon group in $R^{11}$-$R^{15}$ is from 2 to 20 each.

15. The method for producing a carboxyl group-containing copolymer according to claim 8, wherein the cationic monomer (C1) is represented by the formula (9).

16. The method for producing a carboxyl group-containing copolymer according to claim 8, wherein $R^{11}$ and $R^{12}$ are the same as or different from each other and each represents a C1-C20 hydrocarbon group optionally containing a functional group.

17. The method for producing a carboxyl group-containing copolymer according to claim 8, wherein the upper limit of pH in the polymerizing is 5.8.

\* \* \* \* \*